(12) United States Patent
Jayaraj et al.

(10) Patent No.: US 9,306,454 B2
(45) Date of Patent: Apr. 5, 2016

(54) OPTIMAL RIPPLE INJECTION FOR A BOOST REGULATOR

(71) Applicant: Micrel, Inc., San Jose, CA (US)

(72) Inventors: Vinit Jayaraj, Santa Clara, CA (US); Jayant Rao, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 130 days.

(21) Appl. No.: 13/901,407

(22) Filed: May 23, 2013

(65) Prior Publication Data

US 2014/0347027 A1 Nov. 27, 2014

(51) Int. Cl.
| | |
|---|---|
| *G05F 1/00* | (2006.01) |
| *H02M 3/156* | (2006.01) |
| *H02M 1/15* | (2006.01) |
| *H02M 3/158* | (2006.01) |
| *H02M 1/00* | (2007.01) |

(52) U.S. Cl.
CPC .............. *H02M 3/1563* (2013.01); *H02M 1/15* (2013.01); *H02M 3/1588* (2013.01); *H02M 2001/0025* (2013.01)

(58) Field of Classification Search
CPC .................... H02M 3/1563; H02M 2001/0032
USPC ................. 323/222, 271, 282–299, 311–315; 363/16, 43, 65
See application file for complete search history.

(56) References Cited

U.S. PATENT DOCUMENTS

| | | | | |
|---|---|---|---|---|
| 5,969,962 | A * | 10/1999 | Gabor ................. | H02M 1/4225 363/81 |
| 6,583,610 | B2 * | 6/2003 | Groom .................. | H02M 3/156 323/224 |
| 7,030,596 | B1 | 4/2006 | Salerno | |
| 7,482,791 | B2 | 1/2009 | Stoichita et al. | |
| 7,482,793 | B2 * | 1/2009 | Stoichita ....................... | 323/282 |
| 7,598,715 | B1 * | 10/2009 | Hariman ............. | H02M 3/1588 323/222 |
| 8,283,907 | B1 | 10/2012 | Jayaraj | |
| 8,593,125 | B1 * | 11/2013 | Xue ....................... | H02M 3/156 323/280 |
| 2010/0045245 | A1 * | 2/2010 | Hawley ......................... | 323/222 |
| 2012/0014148 | A1 | 1/2012 | Li | |
| 2012/0274296 | A1 | 11/2012 | Higuchi et al. | |
| 2012/0299553 | A1 | 11/2012 | Menegoll | |
| 2012/0313701 | A1 * | 12/2012 | Khlat et al. .................... | 330/127 |

* cited by examiner

*Primary Examiner* — Rajnikant Patel
(74) *Attorney, Agent, or Firm* — Van Pelt, Yi & James LLP

(57) ABSTRACT

A boost switching regulator incorporates a ripple injection circuit to generate a voltage ripple signal for feedback control that mimics the actual ripple signal of the regulated output voltage. In this manner, the ripple injection circuit achieves optimal ripple injection for stable and enhanced feedback control. In one embodiment, the injected ripple signal is generated from a current injection signal that mimics the difference between the inductor current that flows through the synchronous rectifier and the load current when the synchronous rectifier is on. The injected voltage ripple signal is generated when the current injection signal is integrated by a feedforward capacitor.

29 Claims, 11 Drawing Sheets

OPTIMAL RIPPLE INJECTION FOR A BOOST REGULATOR

BACKGROUND OF THE INVENTION

Switch mode power supplies or switching regulators, also referred to as DC-to-DC converters, are often used to convert an input supply voltage to a desired output voltage. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or "buck-boost converter," provides both step-up and step-down functions.

The operation of the switching regulator is well known and is generalized as follows. A power switch is turned on to apply energy to an inductor to allow the current through the inductor to build up. When the power switch is turned off, the voltage across the inductor reverses and energy is transferred to an output capacitor and the load. A relatively constant output voltage is maintained by the output capacitor.

A problem faced by most types of switching regulators is maintaining high efficiency at light load conditions. Switching regulators can become very inefficient at light load (low output current) conditions. One solution to improve efficiency at light load conditions is to use Pulse Frequency Modulation (PFM) in the feedback control loop. When the PFM technique is applied, the switching frequency of the main power switch is made a function of the output power. By switching less often during low output current, the switching losses also reduce at light load.

FIG. 1 is a schematic diagram of a conventional boost switching regulator using PFM feedback control. Referring to FIG. 1, a boost regulator 10 includes a PFM control circuit 24 coupled to drive a first power switch M1 and a second power switch M2. The boost regulator 10 further includes an inductor L1 and an output capacitor $C_{OUT}$. The boost regulator 10 receives an input voltage $V_{IN}$ on a node 12 and provides an output voltage $V_{OUT}$ having a substantially constant magnitude on a node 16 for driving a load 35. The output voltage $V_{OUT}$ is fed back to a feedback node 18 of the boost regulator 10 to form a feedback control loop to realize regulation and control of the output voltage. In the PFM feedback control loop, the output voltage may be fed back to the feedback node directly or through a resistor divider. In the present illustration, a resistor divider circuit including resistors R1 and R2 divides down the output voltage $V_{OUT}$ to provide a feedback voltage $V_{FB}$ (on node 18) to the PFM feedback control loop.

More specifically, the feedback voltage $V_{FB}$ is coupled to an error comparator 20 to be compared with a reference voltage $V_{REF}$ to generate an error signal $V_{ERR}$ (node 22) having logical high and low values. The error signal $V_{ERR}$ is then provided to the PFM control circuit 24 to generate the control signals NGATE (node 28) and PGATE (node 32) for driving the first power switch M1 and the second power switch M2. The NGATE and PGATE signals may be buffered by buffers 26 and 30 respectively. The control signals NGATE and PGATE are operative to turn power switch M1 and M2 on and off alternately so that a switching voltage $V_{SW}$ is generated at the switching node 14. In particular, when the PFM control circuit 24 drives the power switch M1 to turn on and drives the power switch M2 to turn off, inductor L1 has the input voltage $V_{IN}$ impressed upon it, and the current through the inductor builds up. When the PFM control circuit 24 drives the power switch M1 to turn off and drives the power switch M2 to turn on, the voltage across the inductor L1 reverses ("fly back") and inductor L1 delivers energy through switch M2 to the output capacitor $C_{OUT}$ and the load 35. The output capacitor $C_{OUT}$ filters the ramping inductor current to generate a substantially constant output voltage $V_{OUT}$ at the output node 16.

For a PFM feedback control loop or a hysteretic control loop to operate correctly and reliably, a certain amount of voltage ripple is required by the feedback control loop. More specifically, because of the switching action at the power switches, all switch-mode regulators generate an output current ripple through the switched inductor L1. This current ripple manifests itself as an output voltage ripple principally due to the equivalent series resistance (ESR) in the output capacitor $C_{OUT}$ placed in parallel with the load. The ESR of the output capacitor $C_{OUT}$ is denoted as a resistor $R_{ESR}$ in FIG. 1. Recently, low ESR capacitors are preferred to realize improved efficiency and low output voltage ripple in switching regulators. However, the low ESR capacitors do not generate sufficient output voltage ripple for meaningful feedback control. The desire for low output voltage ripple at the output voltage contradicts with the PFM feedback control loop requirement of a certain amount of ripple for reliable operation. The low output ripple signal (typically less than 1 mV) is often too small to be meaningfully used by the PFM feedback control loop of the switching regulator.

In particular, when the low ripple signal on the output voltage is further divided down by the resistor divider and presented to the feedback control loop to be sensed by the error comparator, the ripple signal at the feedback node can be so small that any noise in the switching regulator can completely swamp out the available ripple signal. In operation, the error comparator that senses the feedback voltage can be easily triggered due to noise rather than being triggered by the actual ripple signal. Noise-triggered events at the error comparator often result in multi-pulsing or chattering on the switching node and also cause undesirable frequency components.

Ripple injection circuits to introduce a ripple signal in the feedback loop have been described for buck switching regulators. For example, U.S. Pat. Nos. 7,482,791 and 7,482,793 illustrate examples of ripple injection circuits that can be applied in buck regulators using fixed on-time control.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a boost switching regulator incorporates a ripple injection circuit to generate a ripple signal for feedback control that mimics the actual ripple signal. In this manner, the ripple injection circuit achieves optimal ripple injection for stable and enhanced feedback control and the boost converter can be implemented using a low or zero ESR output capacitor to minimize the output voltage ripple on the output voltage node. In particular, multi-pulsing or chattering at the switch node of the boost switching regulator is obviated. In one embodiment, the injected ripple signal is generated from a current signal that mimics the difference between the instantaneous inductor current that flows through the secondary power switch (the "synchronous rectifier") and the load current. The instantaneous inductor current that flows through the secondary power switch is also referred to as the "synchronous rectifier current." This current difference represents the charge that is actually delivered to the output capacitor when the secondary power switch is turned on which is the charge that creates the actual ripple signal. By replicating the charge delivered to the output capacitor to form the actual ripple signal, the injected ripple signal thus generated provides optimal ripple injection as the injected ripple signal replicates the desired actual ripple signal.

Figure 2:
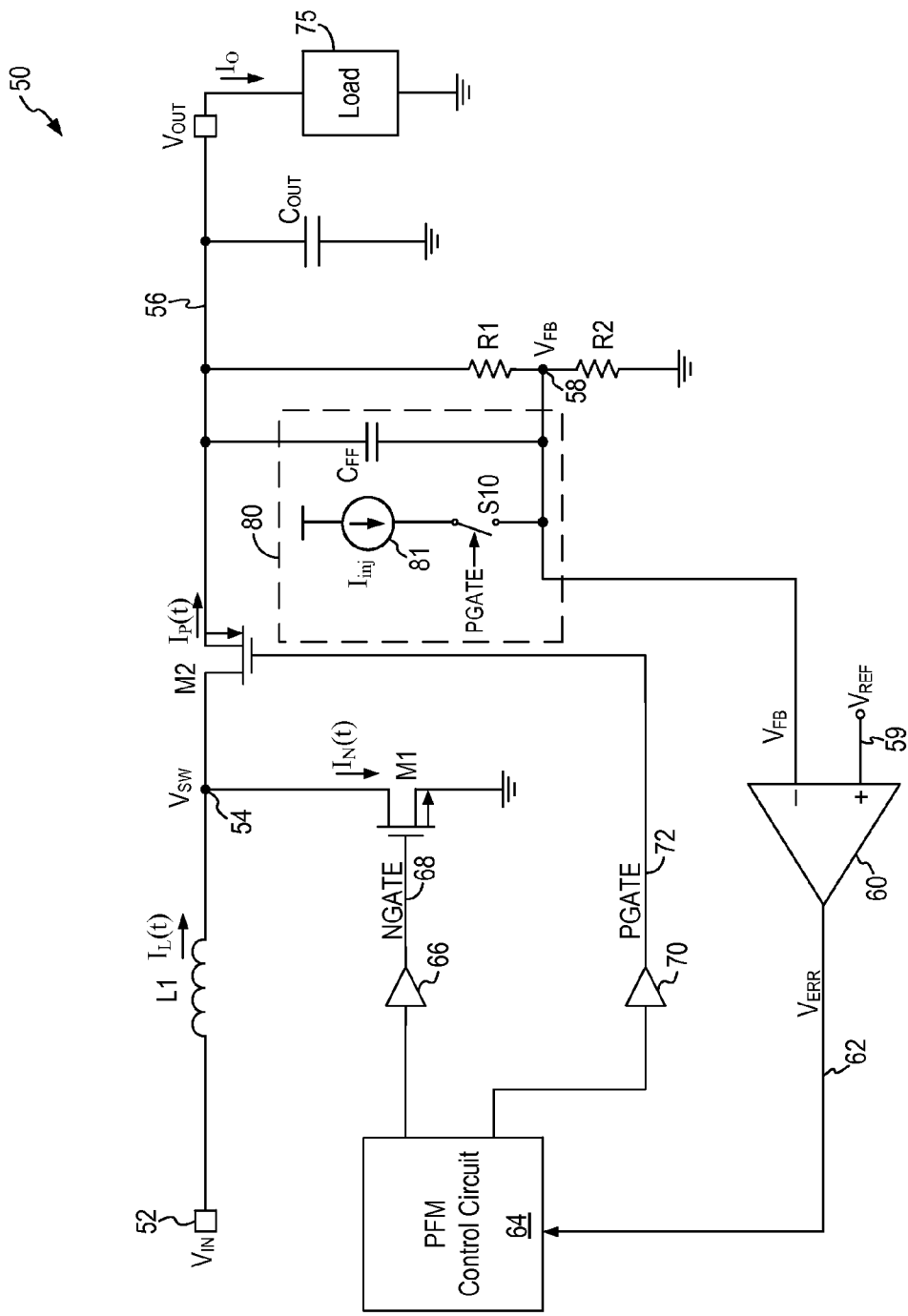
FIG. 2 is a schematic diagram of a boost switching regulator using PFM feedback control and incorporating a ripple injection circuit according to embodiments of the present invention.

FIG. 2 is a schematic diagram of a boost switching regulator using PFM feedback control and incorporating a ripple injection circuit according to embodiments of the present invention. Referring to FIG. 2, a boost switching regulator 50 (or "boost regulator 50") includes a Pulse Frequency Modulation (PFM) control circuit 64, a main power switch M1, a secondary power switch M2, an inductor L1, and an output capacitor $C_{OUT}$. The secondary power switch M2 functions as a synchronous rectifier in the boost regulator and may be referred to as the "synchronous rectifier M2" in the following description. As a synchronous rectifier, power switch M2 is controlled to emulate a diode to allow current to pass in one direction but not the other. The PFM control circuit 64 generates control signals for driving the main power switch M1 and the secondary power switch M2. The boost regulator 50 receives an input voltage $V_{IN}$ on a node 52 and provides an output voltage $V_{OUT}$ having a substantially constant magnitude on an output voltage node 56 for driving a load 75. The output voltage $V_{OUT}$ is fed back to a feedback node 58 of the boost regulator 50 to form a feedback control loop to realize regulation and control of the output voltage $V_{OUT}$.

In boost regulator 50, the output voltage $V_{OUT}$ may be fed back to the feedback node 58 directly or through a resistor divider. In the present embodiment, a resistor divider circuit including resistors R1 and R2 divides down the output voltage $V_{OUT}$ to generate a feedback voltage $V_{FB}$ at the feedback node 58 which is coupled to the PFM feedback control loop. The feedback voltage $V_{FB}$ is thus a scaled down version of the output voltage $V_{OUT}$.

More specifically, the feedback voltage $V_{FB}$ is coupled to an error comparator 60 to be compared with a reference voltage $V_{REF}$ (node 59) to generate an error signal $V_{ERR}$ (node 62) having logical high and low values indicative of the difference between the feedback voltage $V_{FB}$ and the reference voltage $V_{REF}$. The error signal $V_{ERR}$ is then provided to the PFM control circuit 64 to generate the control signals on nodes 68 and 72 for driving the main power switch M1 and the synchronous rectifier M2, respectively. Gate drivers 66 and 70 may be used to drive the respective control signals onto the respective control terminals of the power switches M1 and M2.

The control signals are operative to turn power switch M1 and M2 on and off alternately so that a switching voltage $V_{SW}$ is generated at the switching node 54. In particular, when the PFM control circuit 64 turns on the main power switch M1 and turns off the synchronous rectifier M2, inductor L1 has the input voltage $V_{IN}$ impressed upon it, and the current through the inductor builds up. When the PFM control circuit 64 turns off the power switch M1 and turns on the power switch M2, the voltage across the inductor L1 reverses (fly back) and inductor L1 transfers energy through the synchronous rectifier M2 to the output capacitor $C_{OUT}$ and the load 75. The output capacitor $C_{OUT}$ filters the ramping inductor current to generate a substantially constant output voltage $V_{OUT}$ at the output node 56. In the present embodiment, the boost regulator 50 implements a PFM control scheme where the frequency for turning on the power switches is varied as a function of load condition. When the load condition is heavy, the power switches are turned on and off more frequently to supply sufficient load current to maintain the output voltage. When the load condition is light and the load current demand is low, the power switches may be turned on and off less frequently to maintain the output voltage.

In the present embodiment, the main power switch M1 is implemented as an NMOS transistor and is driven by a control signal NGATE (node 68). Meanwhile, the synchronous rectifier M2 is implemented as a PMOS transistor and is driven by a control signal PGATE (node 72). The control signals NGATE and PGATE are exclusive of each other so that only one of the main power switch M1 and synchronous rectifier M2 is turned on at a time but both switches can be turned off at the same time. The use of NMOS and PMOS transistors as the main and secondary power switches, respectively, is illustrative only and is not intended to be limiting. The main and secondary power switches can be implemented using NMOS or PMOS transistor devices and the PFM control circuit can be configured to generate control signals having the appropriate signal polarities to drive the power switches.

Because of the switching action at the power switches, all switch-mode regulators generate an output current ripple through the switched inductor L1. This current ripple manifests itself as an output voltage ripple on the output voltage in two ways. First, when the output capacitor $C_{OUT}$ has a large amount of equivalent series resistance (ESR), the "IR" voltage drop resulting from the synchronous rectifier current flowing through the ESR of the output capacitor $C_{OUT}$ produces a voltage ripple signal that is similar to and is in-phase with the synchronous rectifier current. Second, the synchronous rectifier current being supplied to the output capacitor $C_{OUT}$ is integrated by the output capacitor to produce a voltage ripple signal that is 90° out-of-phase with the synchronous rectifier current.

When an output capacitor with a large ESR is used, the voltage ripple signal generated by the IR voltage drop is much larger than the voltage ripple signal generated by charging of the output capacitor and the voltage ripple signal due to the ESR is alone sufficient for use by the feedback control loop. The voltage ripple signal generated by the charging of the output capacitor is not significant. However, in cases where the output capacitor $C_{OUT}$ is a low or zero ESR capacitor having zero or an insignificant amount of equivalent series resistance, there is no longer any voltage ripple signal due to the IR voltage drop and the only ripple signal available is the voltage ripple signal generated by the charging of the output capacitor. The voltage ripple signal from charging of the low/zero ESR capacitor is typically very small (e.g., 1.3 mV) and is not sufficient for meaningful feedback control. This voltage ripple signal at the feedback node can become even smaller when the output voltage $V_{OUT}$ is divided down for the feedback loop. The resulting voltage ripple signal on the feedback node can become insignificant (e.g., 0.4 mV). In accordance with embodiments of the present invention, a ripple injection circuit is used to inject a voltage ripple signal on the feedback node that is sufficient for use by the feedback loop for feedback control.

In embodiments of the present invention, the boost regulator 50 incorporates a ripple injection circuit 80 to generate a voltage ripple signal and to introduce an injected ripple signal at the feedback node of the boost regulator. The injected ripple signal mimics the actual ripple signal generated on the output capacitor so that optimal ripple injection is achieved for the PFM feedback control loop and effective regulation of the output voltage $V_{OUT}$ is realized. Referring to FIG. 2, the ripple injection circuit 80 includes a current source 81 providing a current injection signal $I_{inj}$ to the feedback node 58 through a switch S10 and a feedforward capacitor $C_{FF}$ coupled between the output voltage node 56 and the feedback node 58. The feedforward capacitor $C_{FF}$ functions to deliver any ripple signal on the output voltage node 56 to the feedback node 58. However, when the ripple signal on the output capacitor is small, there may not be any appreciable ripple signal for the capacitor $C_{FF}$ to feedforward. In embodiments of the present invention, the current injection signal $I_{inj}$ is injected to the feedback node 58 which is the bottom plate of the feedforward capacitor $C_{FF}$. The feedforward capacitor $C_{FF}$ integrates the current injection signal $I_{inj}$ to generate a voltage ripple signal as the injected ripple signal to the feedback control loop.

In the present embodiment, the current injection signal $I_{inj}$ is provided to the feedback node 58 through the switch S10 which is controlled by the synchronous rectifier control signal PGATE. The control signal PGATE is an active low signal and switch S10 is closed when the control signal PGATE has a logical low value and switch S10 is open when the control signal PGATE has a logical high value. Accordingly, the ripple injection circuit 80 ensures that the injected ripple signal, if any, is applied only when the secondary power switch (the synchronous rectifier) is turned on. Switch S10 is optional and may be omitted in other embodiments of the present invention.

In embodiments of the present invention, the current injection signal $I_{inj}$ mimics the difference between the instantaneous inductor current that flows through the synchronous rectifier M2 and the DC load current $I_O$ flowing through the load 75. The instantaneous inductor current that flows through the synchronous rectifier M2 is referred to as the "synchronous rectifier current." This current difference represents the charge that is actually delivered to the output capacitor $C_{OUT}$ which is the charge that creates the actual ripple signal on the output capacitor. By replicating the charge delivered to the output capacitor $C_{OUT}$ to form the actual ripple signal, the injected ripple signal thus generated provides optimal ripple injection as the injected ripple signal replicates the desired actual ripple signal.

Figure 3:
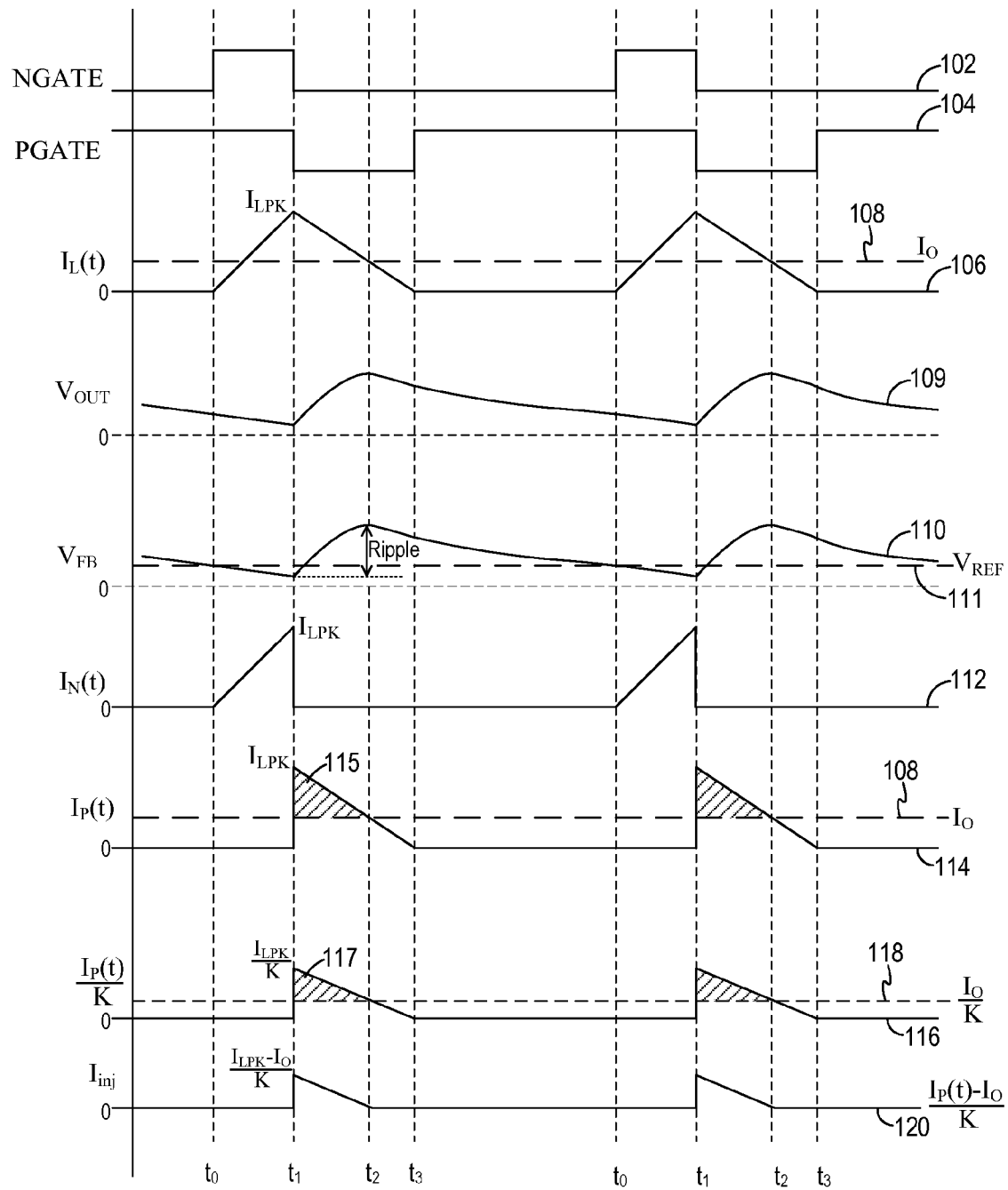
FIG. 3 illustrates the timing waveforms for the boost regulator in FIG. 2 and the generation of the optimal injected ripple signal.

FIG. 3 illustrates the timing waveforms for the boost regulator 50 in FIG. 2 and the generation of the optimal injected ripple signal. Referring to FIGS. 2 and 3, under the control of the PFM feedback control loop, the main power switch M1 and the synchronous rectifier M2 are alternately turned on and off to charge up inductor L1 and to discharge the inductor current to the output capacitor $C_{OUT}$ and to the load 75. The NGATE signal (curve 102) drives the control terminal of the main power switch M1 while the PGATE signal (curve 104) drives the control terminal of the synchronous rectifier M2. The inductor current $I_L(t)$ (curve 106) is a triangular-shaped ramping current signal. The DC load current $I_O$ (curve 108) that is delivered to the load 75 is the average of the synchronous rectifier current $I_P(t)$ flowing through the synchronous rectifier M2 (curve 114). In one example, the synchronous rectifier current $I_P(t)$ can be averaged over a first time duration to generate the load current $I_O$. Typically, the synchronous rectifier current $I_P(t)$ is averaged over the full cycle of the synchronous rectifier current to generate the load current $I_O$. An output voltage $V_{OUT}$ (curve 109) is generated at the output node and is fed back to the feedback control loop of the boost regulator 50. The feedback voltage $V_{FB}$ (curve 110) can be the same as the output voltage $V_{OUT}$ or it can be a scaled down version of the output voltage $V_{OUT}$. The peak-to-peak magnitude of the feedback voltage $V_{FB}$ is the ripple signal needed by the feedback control loop for regulation. The feedback voltage $V_{FB}$ (curve 110) is compared against a reference voltage $V_{REF}$ (curve 111) for feedback control.

In the present illustration, the boost regulator 50 operates under the PFM control scheme in a discontinuous conduction mode. In the discontinuous conduction mode, the inductor current $I_L(t)$ is allowed to drop to zero before the main power switch is turned back on again to recharge the inductor L1. In some embodiments, a zero-cross detector (not shown) may be coupled across the synchronous rectifier M2 (that is, coupled to the source and drain terminals of transistor M2) to detect when the inductor current has dropped to zero. Under the PFM control scheme, when the inductor current $I_L(t)$ has dropped to zero and the feedback voltage $V_{FB}$ drops below the reference voltage $V_{REF}$ (time $t_0$), the PFM control circuit 64 initiates a main switch cycle. That is, the control signal NGATE is asserted (logical high) to turn on the main power switch M1. The inductor current ramps up when the main power switch M1 is turned on. When the inductor current reaches a predetermined peak inductor current level $I_{LPK}$, the control signal NGATE is then deasserted (logical low) to turn off the main power switch M1. The PFM control scheme continues by initiating a secondary switch cycle at time $t_1$. That is, the control signal PGATE is asserted (logical low) to turn on the synchronous rectifier M2. The inductor current $I_L(t)$ is delivered to the output capacitor $C_{OUT}$ and the load 75. Therefore, the inductor current $I_L(t)$ ramps down when the synchronous rectifier M2 is turned on but the output voltage $V_{OUT}$ is restored. The synchronous rectifier M2 remains turned on until the inductor current $I_L(t)$ drops to zero (time $t_3$). Then, the control signal PGATE is deasserted (logical high) to turn off the synchronous rectifier M2.

Between time $t_3$ and the next main switch cycle (the next $t_0$), both power switches M1 and M2 are turned off and the feedback voltage $V_{FB}$ decreases towards the reference voltage $V_{REF}$ as the output voltage $V_{OUT}$ falls. This period is referred to as the Idle time. If the boost regulator 50 is operating under light load conditions, it may take a long time for the feedback voltage $V_{FB}$ to decay to the reference voltage $V_{REF}$ because the load current $I_O$ is very small. Thus, the idle time between $t_3$ and $t_0$ may be long. However, eventually, the feedback voltage $V_{FB}$ will decrease below the reference voltage $V_{REF}$ and the next main switch cycle and secondary switch cycle repeat in the same manner as described above.

As thus configured, the PFM feedback control loop operates on the ripple components of the feedback voltage $V_{FB}$ in order to regulate the output voltage. However, the ripple component of the feedback voltage $V_{FB}$ may be very small, such as due to the use of zero or low ESR output capacitor $C_{OUT}$. In embodiments of the present invention, the ripple injection circuit generates an injected ripple signal for the feedback control loop by mimicking the ripple signal that would be generated by the charge being delivered to the output capacitor. In this manner, optimal ripple injection is achieved.

Referring again to FIG. 3, the inductor current $I_L(t)$ includes two current components. When the main power switch M1 is turned on, the inductor current component $I_N(t)$ (curve 112) flows through the main power switch M1. Then, when the synchronous rectifier M2 is turned on, the inductor current component $I_P(t)$ (curve 114) flows through the synchronous rectifier M2. The inductor current component $I_P(t)$ that flows through the synchronous rectifier M2, referred to as the "synchronous rectifier current", is the current that is being delivered to the output capacitor $C_{OUT}$ and to the load 75. However, only a portion of the synchronous rectifier current $I_P(t)$ is consumed by the load current $I_O$ (curve 108). The remaining synchronous rectifier current $I_P(t)$, being the current $I_P(t)$ above the load current $I_O$, is delivered to the output capacitor $C_{OUT}$. The output capacitor $C_{OUT}$ integrates this portion of the synchronous rectifier current $I_P(t)$ to generate the intended voltage ripple signal. In other words, the area below the synchronous rectifier current $I_P(t)$ curve 114 and above the load current $I_O$ curve 108, denoted by the shaded region 115 in FIG. 3, represents the amount of charge that is put on the output capacitor $C_{OUT}$. The amount of charge in the shaded region 115 represents the actual ripple signal that is generated by output capacitor $C_{OUT}$ in response to the operation of the PFM feedback control loop.

Accordingly, in boost regulator 50, the difference between the inductor current that flows through the synchronous rectifier M2 (the synchronous rectifier current $I_P(t)$) and the load current $I_O$ is the charge that creates the actual ripple signal. In embodiments of the present invention, the ripple injection circuit 80 mimics this current difference $I_P(t)-I_O$ to generate a current injection signal $I_{inj}$ that is equal to or proportional to the current difference $I_P(t)-I_O$. In some cases, the current difference $I_P(t)-I_O$ is scaled down to create the current injection signal $I_{inj}$. That is:

$$I_{inj} = \frac{I_P(t) - I_O}{K},$$

where K can be 1 or greater.

In some embodiments, the ripple injection circuit scales down the synchronous rectifier current $I_P(t)$ by a factor of K to generate a current $I_P(t)/K$ (curve 116) and the ripple injection circuit further scales down the load current $I_O$ by the same factor K to generate a current $I_O/K$ (curve 118). The current difference between current $I_P(t)/K$ and current $I_O/K$ is the current injection signal $I_{inj}$ (curve 120). That is, $I_{inj}=(I_P(t)-I_O)/K$. More specifically, the current injection signal $I_{inj}$ incorporates the charge represented by the shaded region 117. The feedforward capacitor $C_{FF}$ integrates the current injection signal $I_{inj}$ to obtain the charge in the shaded region 117 which produces the voltage ripple signal on the feedback voltage $V_{FB}$. This voltage ripple signal is of a useful amount to the PFM feedback control loop.

A salient feature of the ripple injection circuit of the present invention is that the optimal amount of ripple signal is being injected into the feedback loop. More specifically, because the current injection signal $I_{inj}$ is generated by mimicking the charge that is being put on the output capacitor $C_{OUT}$, the resulting injected ripple signal provided to the feedback node mimics the actual ripple signal generated by the output capacitor $C_{OUT}$. Another salient feature of the ripple injection circuit of the present invention is that only a small feedforward capacitor $C_{FF}$ is needed to generate a sufficient voltage ripple signal for the feedback control loop. That is, the capacitance of the feedforward capacitor $C_{FF}$ can be small. In particular, the current difference $I_P(t)-I_O$ can be scaled down such that the current injection signal $I_{inj}$ incorporates only a portion of the charge (region 115) that is actually put on the output capacitor $C_{OUT}$. Accordingly, a smaller feedforward capacitor $C_{FF}$ can be used to integrate the current injection signal $I_{inj}$ encompassing the smaller portion of the charge (region 117) to yield a voltage ripple signal having sufficiently large amplitude (e.g., 10 mV) on the feedback node 58. In some embodiments, the capacitance of capacitor $C_{FF}$ is sufficiently small such that the capacitor can be formed as an integrated capacitor on the same integrated circuit as the control circuitry of boost regulator 50. That is, a discrete capacitor is not needed to implement $C_{FF}$ in the boost regulator of the present invention. In one example, the output capacitor $C_{OUT}$ may be a 50 µF capacitor while the feedforward capacitor may be a 10 pF capacitor.

Figure 4:
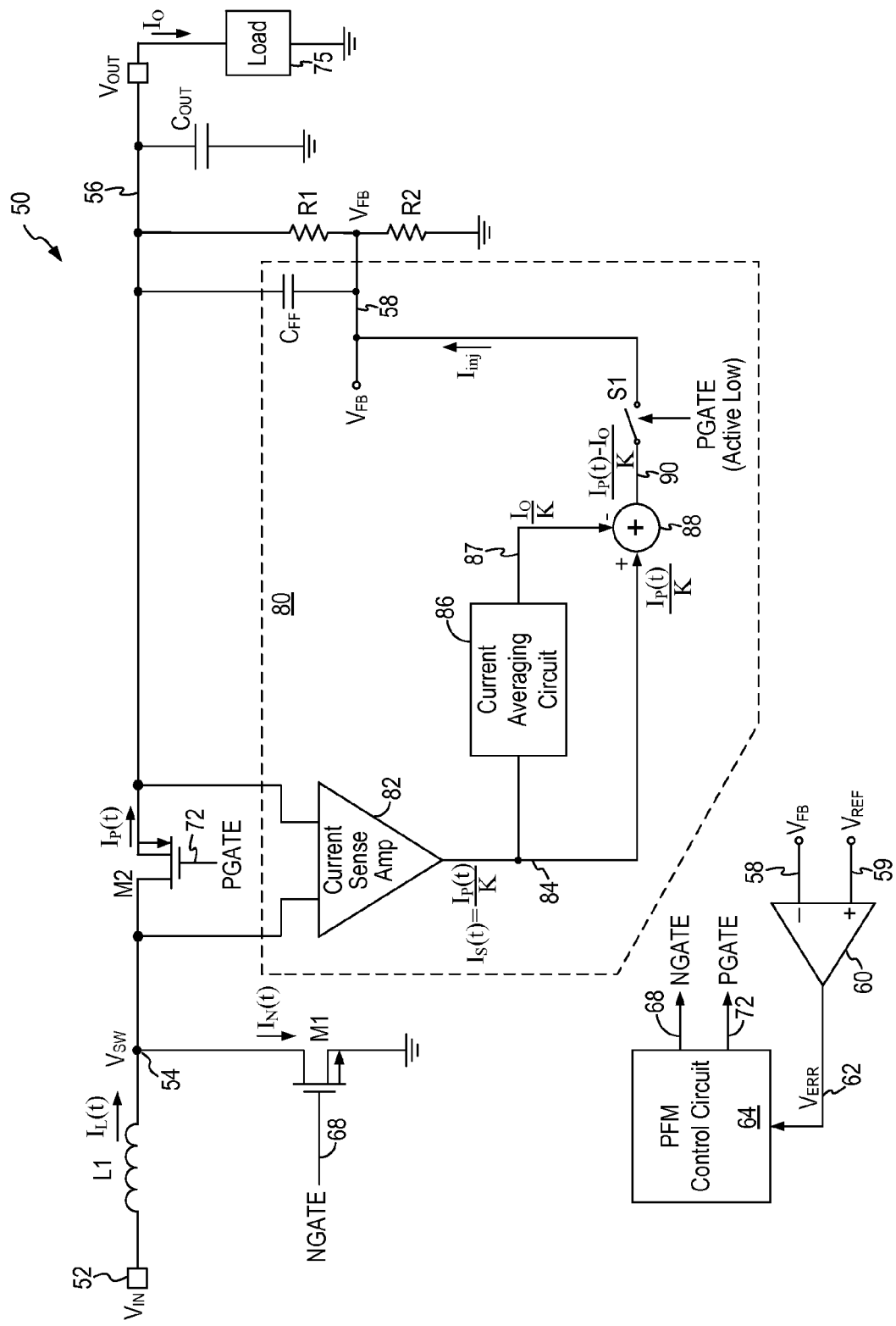
FIG. 4 is a schematic diagram of a boost switching regulator illustrating a detail implementation of a ripple injection circuit according to embodiments of the present invention.

FIG. 4 is a schematic diagram of a boost switching regulator illustrating a detail implementation of a ripple injection circuit according to embodiments of the present invention. Like elements in FIGS. 2 and 4 are given like reference numerals and will not be further described. FIG. 4 illustrates one embodiment of the ripple injection circuit 80 for generating an injected ripple signal. Referring to FIG. 4, the ripple injection circuit 80 includes a current sense amplifier 82 coupled across the synchronous rectifier M2 to measure the synchronous rectifier current $I_P(t)$. In the present embodiment, the current sense amplifier 82 also operates to scale down the measured current by a factor of K. Thus, the current sense amplifier 82 generates an output current $I_S(t)$ (node 84) being proportional to the synchronous rectifier current $I_P(t)$, that is, $I_S(t)=I_P(t)/K$. The current $I_S(t)$ represents the synchronous rectifier current flowing through the synchronous rectifier M2. The current $I_S(t)$ is averaged to determine the load current being drawn over a given time period. In the present embodiment, a current averaging circuit 86 receives the current $I_S(t)$ and generates a scaled load current $I_O/K$ (node 87) being an average of the current $I_S(t)$ over a given time duration, usually over a full cycle of the synchronous rectifier current. That is, $I_O/K=Avg(I_S(t))=Avg(I_P(t)/K)$. In one embodiment, the current averaging circuit 86 averages the current $I_S(t)$ over a full synchronous rectifier cycle, that is from time $t_1$ to the next time $t_1$ (FIG. 3).

The current injection signal $I_{inj}$ is generated by taking the difference between the current $I_S(t)$ (or $I_P(t)/K$), representing the scaled synchronous rectifier current at synchronous rectifier M2, and the current $I_O/K$, representing the scaled load current being drawn. In the present embodiment, a current subtractor 88 is used to subtract current $I_O/K$ from current $I_P(t)/K$ to generate the current injection signal $I_{inj}=(I_P(t)-I_O)/K$ (node 90). In the present embodiment, the current subtractor 88 is a one-quadrant subtractor. When the synchronous rectifier current $I_P(t)$ is greater than the load current $I_O$, the current subtractor 88 generates a positive output current indicative of the current difference between the scaled synchronous rectifier current $I_P(t)/K$ and the scaled load current $I_O/K$ as the current injection signal $I_{inj}$. When the synchronous rectifier current $I_P(t)$ is smaller than the load current $I_O$, the subtractor provides a zero current output. The current injection signal $I_{inj}$, when integrated by the feedforward capacitor $C_{FF}$, produces a voltage ripple signal on the feedback voltage $V_{FB}$ (node 58) that is in phase with the ripple on the output voltage $V_{OUT}$.

In embodiments of the present invention, the ripple injection circuit 80 applies the current injection signal $I_{inj}$ only when the synchronous rectifier is turned on. In the present embodiment, the current injection signal $I_{inj}$ thus generated is injected to the feedback node 58 through a switch S1. The switch S1 is controlled by the control signal PGATE which is an active low signal. Thus, the ripple injection circuit 80 ensures that the injected ripple signal is applied only when the synchronous rectifier M2 is turned on. When the synchronous rectifier M2 is turned on, the injected ripple signal, if any, is introduced. When the synchronous rectifier M2 is turned off, the injected ripple signal is not applied. As thus configured, when switch S1 is closed, the current injection signal $I_{inj}$ is injected at the feedback node 58 and the current associated with signal $I_{inj}$ is integrated by the feedforward capacitor $C_{FF}$ to generate the necessary voltage ripple signal at the feedback node 58 for the PFM feedback control loop. Switch S1 is optional and may be omitted in other embodiments of the present invention. As described above, the current injection signal $I_{inj}$ goes to a zero value when the synchronous rectifier current $I_P(t)$ drops below the load current $I_O$. Thus, switch S1 is not necessary to turn off the current injection signal but helps to ensure that the current injection signal $I_{inj}$ goes to zero when the synchronous rectifier cycle is completed.

Figure 5:
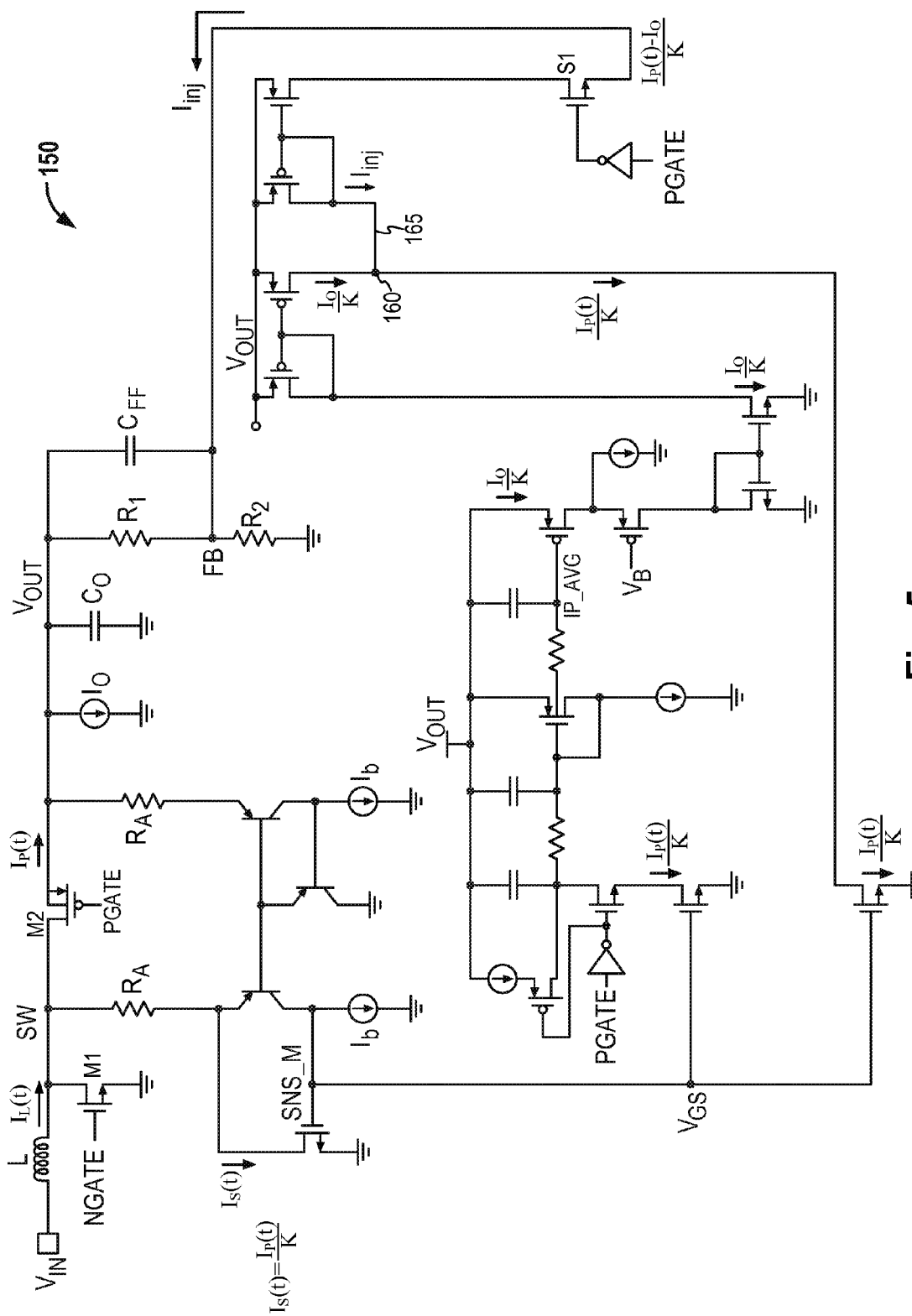
FIG. 5 is a schematic diagram of a boost switching regulator illustrating a transistor level implementation of a ripple injection circuit according to embodiments of the present invention.

FIG. 5 is a schematic diagram of a boost switching regulator illustrating a transistor level implementation of a ripple injection circuit according to embodiments of the present invention. In particular, FIG. 5 illustrates the transistor level implementation of the current sense amplifier, the current averaging circuit and the current subtractor circuit in a boost switching regulator 150. In the embodiment shown in FIG. 5, the subtraction of the scaled load current $I_O/K$ from the scaled synchronous rectifier current $I_P(t)/K$ is realized at the summing node 160. In operation, the scaled load current $I_O/K$ is coupled to the top of the summing node 160 and the scaled synchronous rectifier current $I_P(t)/K$ is drawn from the bottom of the summing node 160. When the scaled synchronous rectifier current $I_P(t)/K$ is larger than the scaled load current Io/K, a current is drawn from the branch 165 into the summing node 160. The current drawn into the summing node 160 from branch 165 is the current injection signal $I_{INJ}$ which is $I_P(t)/K-I_O/K$. When the scaled synchronous rectifier current $I_P(t)/K$ is smaller than the scaled load current $I_O/K$, no current can be drawn from the branch 165 and thus the current injection signal $I_{INJ}$ is zero. In this way, a one-quadrant subtractor is implemented where current injection signal $I_{INJ}$ can have only positive values or is zero. Current $I_{inj}$ is mirrored by a current mirror and then gated by a transistor functioning as the switch S1. When switch S1 is active, the current injection signal $I_{inj}$ is provided to the feedback node FB to be integrated by the feedforward capacitor $C_{FF}$.

In the embodiment shown in FIG. 5, the current sense amplifier is constructed to scale down the synchronous rectifier current $I_P(t)$ by a factor of K while measuring the current $I_P(t)$. In particular, a pair of resistors $R_A$ is used to scale down the current $I_P(t)$. In some embodiments, the resistor $R_A$ is built using smaller versions of the synchronous rectifier M2. That is, the resistor $R_A$ includes a string of serially connected transistors being scaled-down transistors of the synchronous rectifier M2. Using a string of scaled-down transistors of synchronous rectifier M2 in the current sense amplifier to scale down the current $I_P(t)$ provides certain advantages.

First, the scale ratio K of the scaled synchronous rectifier current $I_S(t)$ is a function of the on-resistance $R_{ds-ON}$ of the synchronous rectifier M2 and the resistance of resistor $R_A$. For example, when a string of scaled-down transistors of synchronous rectifier M2 is used in the current sense amplifier, the scaling factor K can be set as follows:

$$I_P(t) \times R_{ds-ON}(M2) = I_S(t) \times R_A,$$
$$I_S(t) = \frac{I_P(t)}{K} = I_P(t) \frac{R_{ds-ON}(M2)}{R_A},$$
$$K = \frac{R_A}{R_{ds-ON}(M2)}.$$

When the resistor $R_A$ is designed using scaled version of the synchronous rectifier M2, resistor $R_A$ has a resistance value being a scaled value of the on-resistance of synchronous rectifier M2. In this manner, the ratio K can be made to be a constant.

Figure 6:
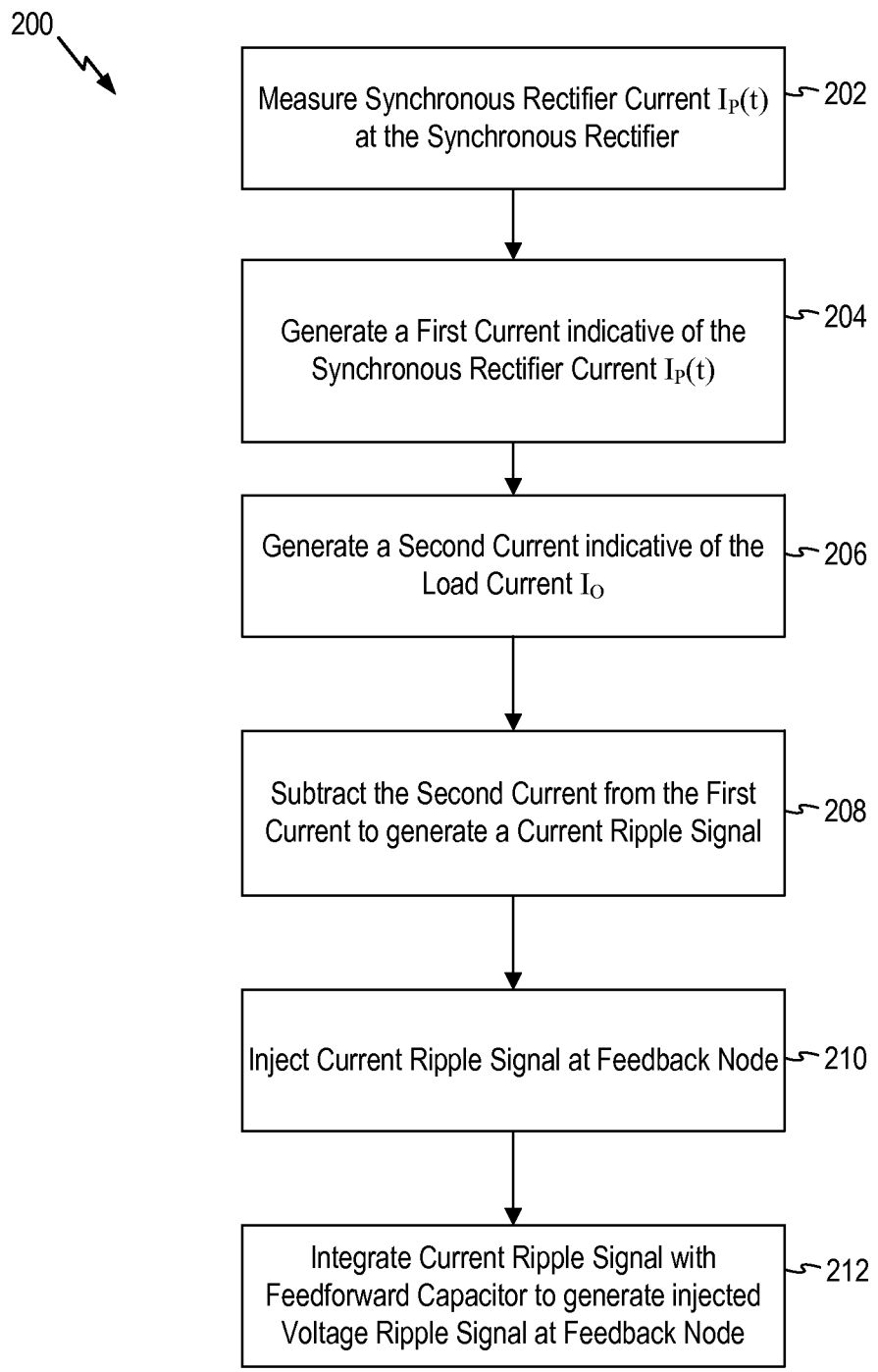
FIG. 6 is a flow chart illustrating the optimal current injection method in a boost regulator in embodiments of the present invention.

FIG. 6 is a flow chart illustrating the optimal current injection method in a boost regulator in embodiments of the present invention. Method 200 can be implemented in a boost switching regulator, such as the boost regulator of FIG. 2, to achieve optimal ripple injection. Referring to FIG. 6, method 200 starts at 202 by measuring the synchronous rectifier current $I_P(t)$ at the synchronous rectifier M2. Then, at 204, a first current indicative of the measured synchronous rectifier current $I_P(t)$ is generated. For example, the first current can be a scaled version of the measured synchronous rectifier current $I_P(t)$, that is, the first current can be $I_P(t)/K$, where K can be 1 or greater. At 206, a second current indicative of the load current $I_O$ is generated. For example, the second current can be a scaled version of the load current, that is, the second current can be $I_O/K$. At 208, the second current is subtracted from the first current to generate the current injection signal $I_{inj}$. In one embodiment, the subtraction is a one-quadrant subtraction and only a positive current value is generated when the first current is greater than the second current, otherwise, the subtraction yield a zero current value. At 210, the current injection signal $I_{inj}$ is injected to the feedback node of the feedback control loop of the boost regulator. At 212, the feedforward capacitor integrates the current injection signal $I_{inj}$ to generate the injected voltage ripple signal at the feedback node of the feedback control loop.

Figure 7:
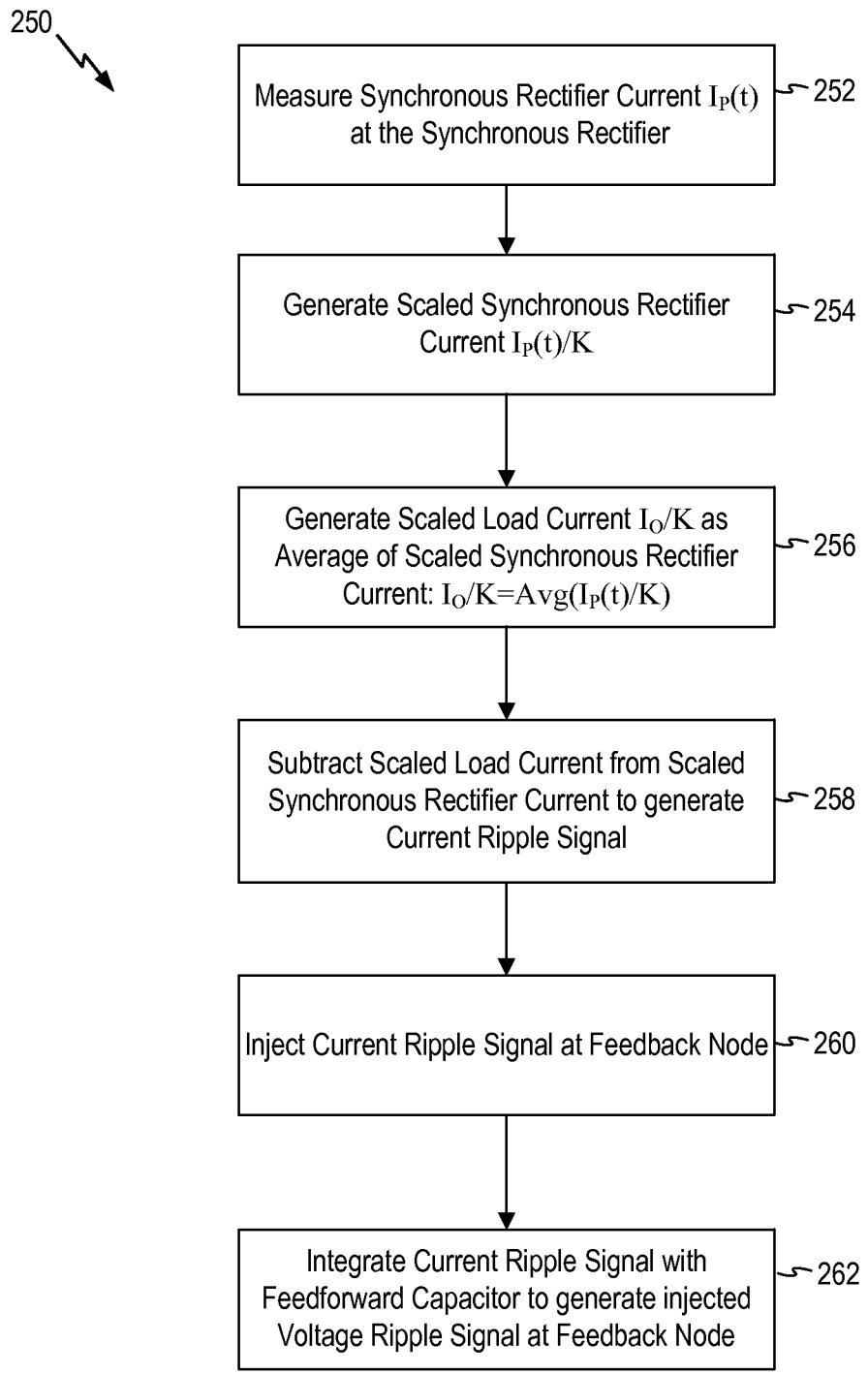
FIG. 7 is a flow chart illustrating the optimal current injection method in a boost regulator in alternate embodiments of the present invention.

FIG. 7 is a flow chart illustrating the optimal current injection method in a boost regulator in alternate embodiments of the present invention. Method 250 can be implemented in a boost switching regulator, such as the boost regulator of FIG. 4, to achieve optimal current injection. Referring to FIG. 7, method 250 starts at 252 by measuring the synchronous rectifier current $I_P(t)$ at the synchronous rectifier M2. Then, at 254, a scaled synchronous rectifier current $I_P(t)/K$ is generated, where K can be 1 or greater. At 256, a scaled load current $I_O/K$ is generated as an average of the scaled synchronous rectifier current $I_P(t)/K$ over a given time duration, usually over a full cycle of the synchronous rectifier current. That is, $I_O/K=\text{Avg}(I_P(t)/K)$. At 258, the scaled load current $I_O/K$ is subtracted from the scaled synchronous rectifier current $I_P(t)/K$ to generate the current injection signal $I_{inj}$. In one embodiment, the subtraction is a one-quadrant subtraction and only a positive current value is generated when the scaled synchronous rectifier current is greater than the scaled load current, otherwise, the subtraction yield a zero current value. At 260, the current injection signal $I_{inj}$ is injected to the feedback node of the feedback control loop of the boost regulator. At 262, the feedforward capacitor integrates the current injection signal $I_{inj}$ to generate the injected voltage ripple signal at the feedback node of the feedback control loop.

Figure 8:
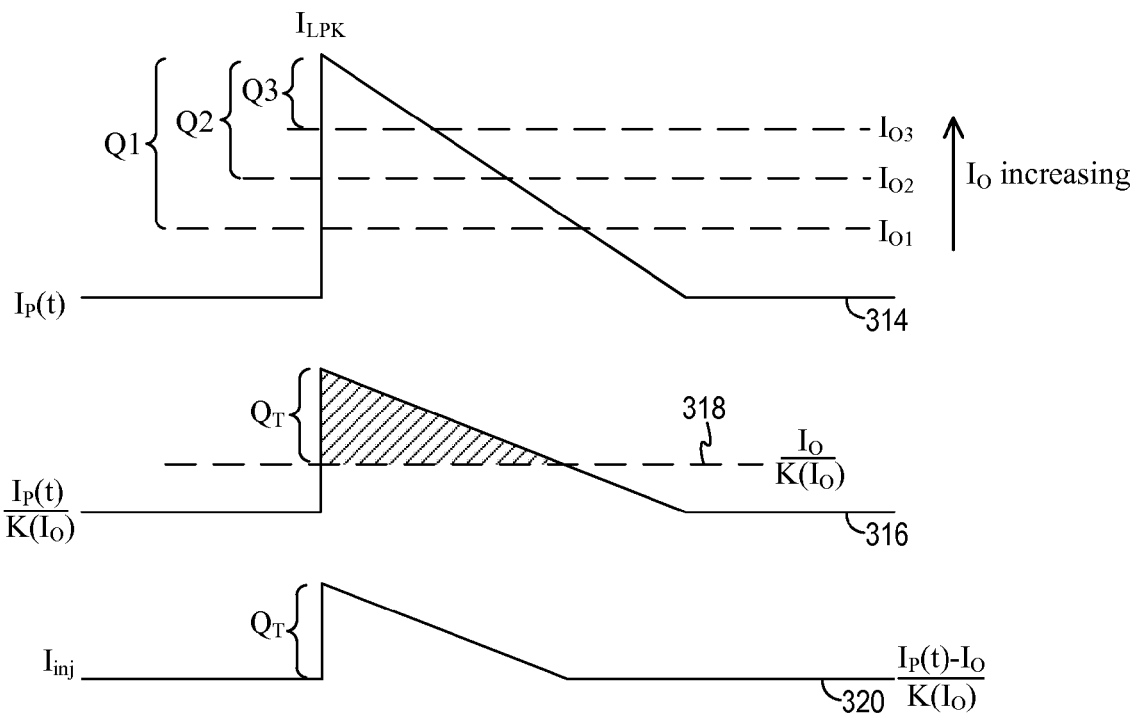
FIG. 8 illustrates the synchronous rectifier current relative to varying load conditions and further illustrates adjusting the scaling factor K to generate the desired current injection signal.

During the operation of the boost regulator, the load condition may change and the load current $I_O$ may vary. Most boost regulators maintain a fixed peak inductor current value $I_{LPK}$. When the peak inductor current value is fixed, the varying load current $I_O$ will vary the amount of charge being replicated to generate the current injection signal. FIG. 8 illustrates the synchronous rectifier current relative to varying load conditions. Referring to FIG. 8, the synchronous rectifier current $I_P(t)$ (curve 314) is being kept at a fixed peak inductor current value $I_{LPK}$. When load conditions change, the load current may vary. For example, the load current may vary from a light load condition $I_{O1}$ to a heavy load condition $I_{O3}$ within the PFM operation range. When the load current increases, the amount of charge under the current $I_P(t)$ waveform decreases from Q1 to Q3. The decreasing amount of charge means that the current injection signal thus generated can become smaller than desired.

In some embodiments of the present invention, the ripple injection circuit is configured to handle varying load current values. In one embodiment, the scaling factor K used to scale down the measured synchronous rectifier current $I_P(t)$ is selected to account for the worst case load current conditions. That is, K is selected so that even under the largest permissible load current condition, the scaled synchronous rectifier current $I_P(t)/K$ will still have sufficient charge to generate an adequate current injection signal for the feedback control loop.

In another embodiment, the ripple injection circuit is configured to select a scaling factor K as a function of the load current, with is denoted as "$K(I_O)$," so as to maintain a relatively constant amount of charge $Q_T$ after the current subtraction is performed using the scaled synchronous rectifier current $I_P(t)/K(I_O)$ (curve 316) and the scaled load current $I_O/K(I_O)$ (curve 318). For example, when the load current is small, the value of K can be selected to be large to scale down the synchronous rectifier current by a large amount. But when the load current is large, the value of K can be selected to be small to scale down the synchronous rectifier current to a lesser amount so as to maintain a constant amount of charge $Q_T$ after the current subtraction. The current injection signal $I_{inj}$ (curve 320) thus generated will have a relatively constant magnitude regardless of variations in the load current values.

In yet other embodiments of the present invention, the ripple injection circuit is configured to vary the capacitance of the feedforward capacitor $C_{FF}$ as a function of load current. When the load current is large, the feedforward capacitor $C_{FF}$ can be configured with a smaller capacitance as the amount of charge is small. When the load current is small, the feedforward capacitor $C_{FF}$ can be configured with a larger capacitance as the amount of charge is large. In other words, the capacitance value of the feedforward capacitor $C_{FF}$ can increase when the load current is decreasing. The magnitude of the voltage ripple signal remains relatively constant with changing load conditions.

Figure 9:
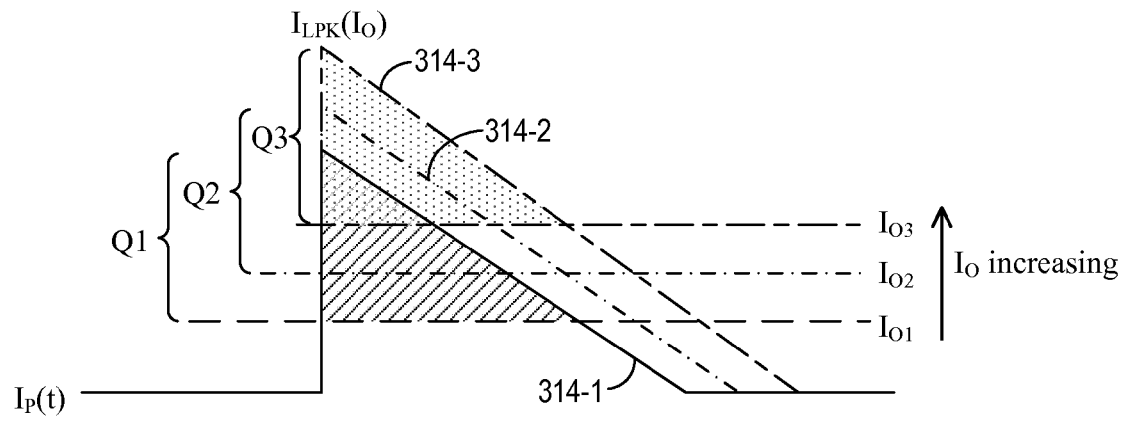
FIG. 9 illustrates the synchronous rectifier current relative to varying load conditions and further illustrates adjusting the peak inductor current to generate the desired current injection signal.

In yet other embodiments, the boost regulator is configured to adaptively modulate the peak inductor current value as a function of the load current. FIG. 9 illustrates the synchronous rectifier current relative to varying load conditions. Referring to FIG. 9, the synchronous rectifier current $I_P(t)$ has a peak inductor current value $I_{LPK}$ that varies as a function of the load current $I_O$. When the load current is low ($I_{O1}$), the peak inductor current may be maintained at a lower level ($I_P(t)$ curve 314-1). As the load current increases ($I_{O3}$), the peak inductor current may be increased ($I_P(t)$ curve 314-3). When the peak inductor current value $I_{LPK}$ varies with the load current $I_O$, relatively constant amount of charge $Q_1$ to $Q_3$ can be maintained between the synchronous rectifier current $I_P(t)$ and the load current $I_O$. Thus, by modulating the peak inductor current value as a function of load current, the ripple injection circuit can operate with varying load conditions to generate a current injection signal with a relatively constant magnitude.

Figure 1:
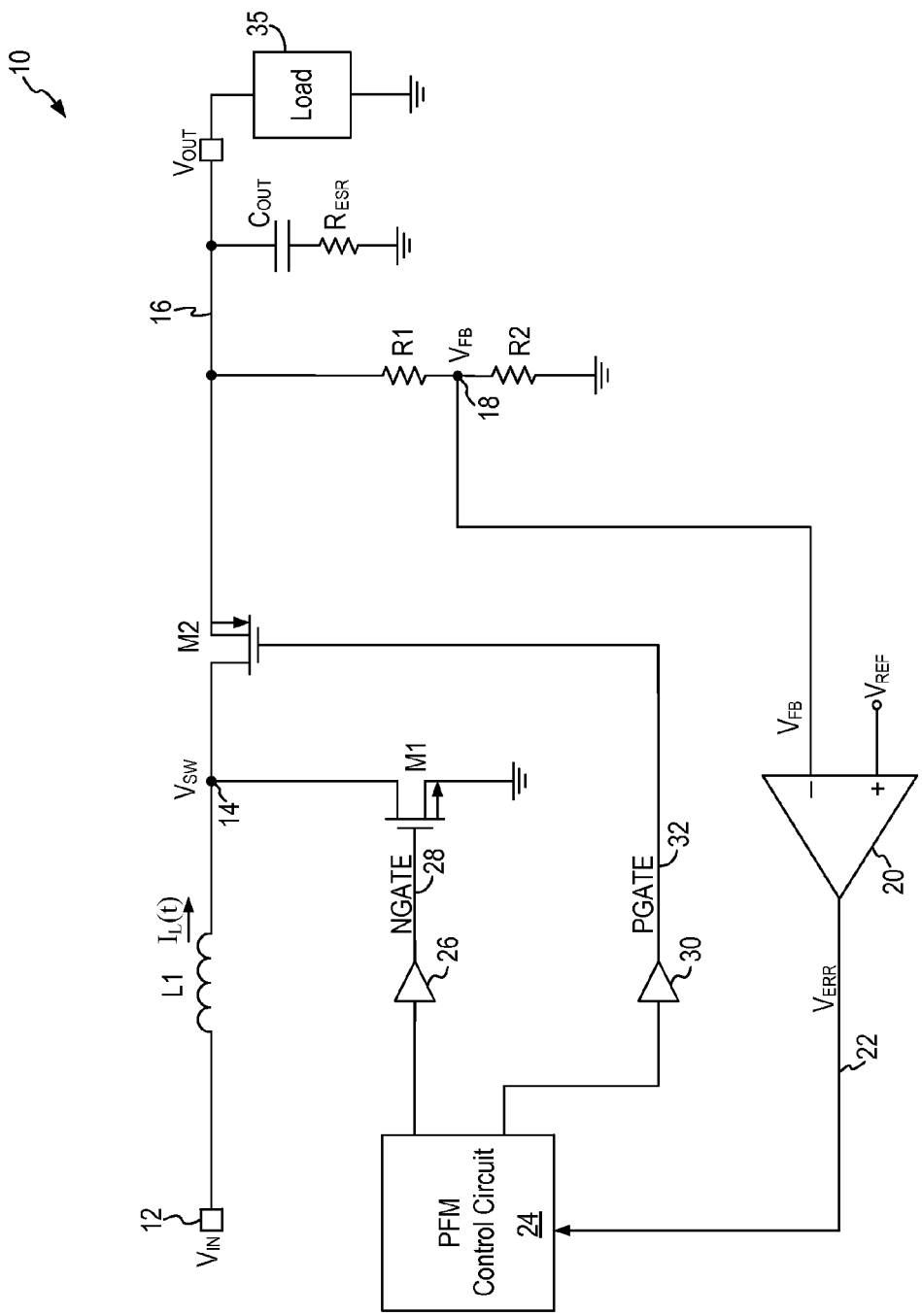
FIG. 1 is a schematic diagram of a conventional boost switching regulator using PFM feedback control.
Figure 10A:
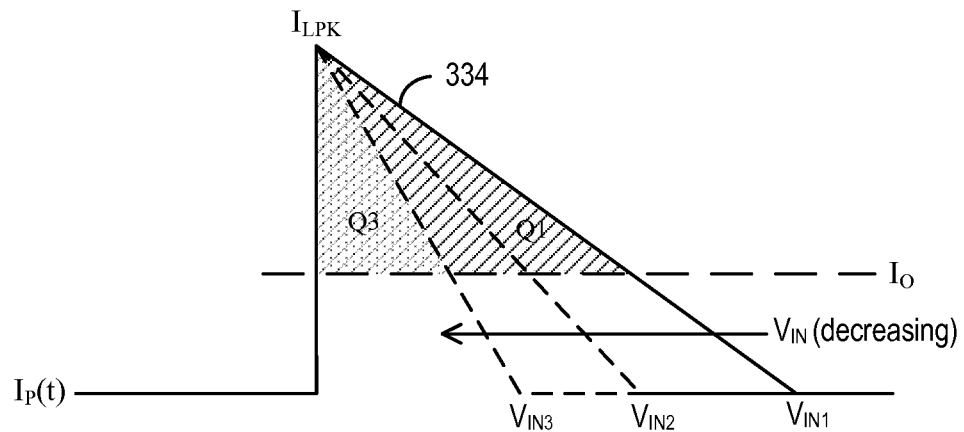
FIG. 10(a) illustrates the synchronous rectifier current relative to varying input voltage conditions.

In some applications, the boost regulator is applied to boost an input voltage supplied by a battery. As the battery discharges over time, the battery voltage decreases and the regulator input voltage $V_{IN}$ also decreases over time. As the input voltage $V_{IN}$ decreases, the slope of the synchronous rectifier current increases which will decrease the amount of charge that can be replicated to generate the current injection signal $I_{inj}$. FIG. 10(a) illustrates the synchronous rectifier current relative to varying input voltage conditions. Referring to FIG. 10(a), when the synchronous rectifier current $I_P(t)$ (curve 334) is being kept at a fixed peak inductor current value $I_{LPK}$ and when the input voltage $V_{IN}$ decreases, the slope of the synchronous rectifier current $I_P(t)$ increases so that the synchronous rectifier current drops to zero current value faster with decreasing $V_{IN}$. In particular, in a boost regulator, such as boost regulator 10 of FIG. 1, when the synchronous rectifier M2 is turned on, the synchronous rectifier current $I_P(t)$ flows through the inductor L1 and the voltage across the inductor L1 is $V_{OUT}-V_{IN}$. The rate of change, or slope, of the inductor current di/dt is given as:

$$\frac{di}{dt} = \frac{V_{OUT} - V_{IN}}{L} = \frac{I_{LPK}}{T_{off}},$$

where L is the inductance of the inductor L1 and Toff is the on time of the synchronous rectifier switch or the on time of the control signal PGATE.

As shown by the above equation and shown in FIG. 10(a), for a given output voltage $V_{OUT}$, as the input voltage $V_{IN}$ decreases (e.g., from $V_{IN1}$ to $V_{IN3}$), the slope of the synchronous rectifier current $I_P(t)$ increases. For a given load condition, represented by the load current $I_O$, the amount of charge under the current $I_P(t)$ waveform 334 decreases as $V_{IN}$ decreases. As illustrated, as $V_{IN}$ decreases, the amount of charge that can be used to generate the current injection signal $I_{inj}$ decreases as indicated by the shaded regions. For example, when the input voltage is at $V_{IN1}$, the amount of charge Q1 (cross-hatched area) is available to generate the current injection signal $L_{inj}$. However, when the input voltage decreases to $V_{IN3}$, only the amount of charge Q3 (the dotted area) is available to generate the current injection signal $I_{inj}$. The charge Q3 is much smaller than the charge Q1. The decreasing amount of charge means that the current injection signal $I_{inj}$ thus generated can become smaller than desired.

Figure 10B:
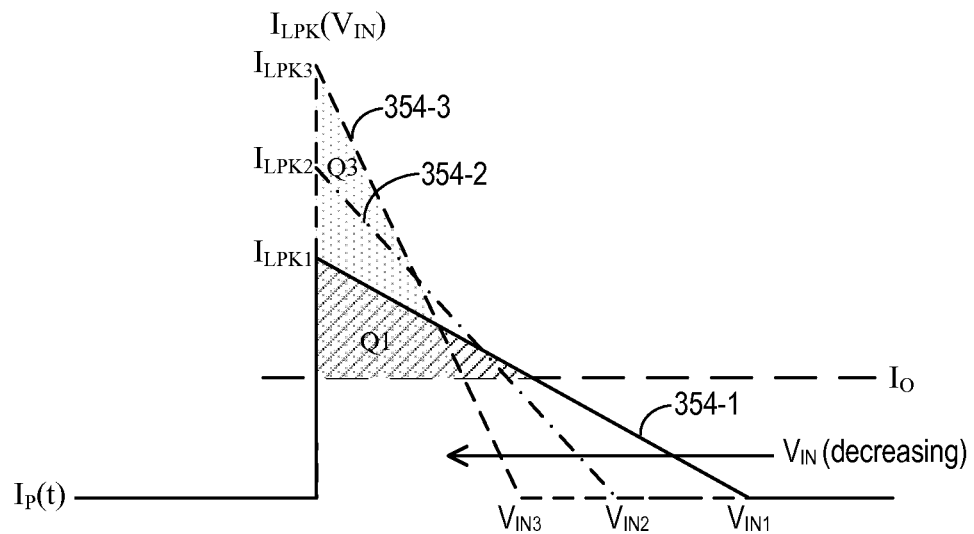
FIG. 10(b) illustrates the synchronous rectifier current when the peak inductor current is varied as a function of the regulator input voltage.

In some embodiments, the boost regulator is configured to adaptively modulate the peak inductor current value as a function of the regulator input voltage $V_{IN}$. FIG. 10(b) illustrates the synchronous rectifier current when the peak inductor current is varied as a function of the regulator input voltage. Referring to FIG. 10(b), the synchronous rectifier current $I_P(t)$ has a peak inductor current value $I_{LPK}$ that varies as a function of the input voltage $V_{IN}$. More specifically, the peak inductor current value $I_{LPK}$ is modulated as $I_{LPK} \propto (V_{OUT}-V_{IN})$. In one embodiment, the peak inductor current value $I_{LPK}$ is modulated as:

$$I_{LPK} = \frac{V_{OUT} - V_{IN}}{R}$$

where R is a constant of proportionality.

In operation, for a given output voltage $V_{OUT}$, as the input voltage $V_{IN}$ decreases, the peak inductor current value $I_{LPK}$ increases. For example, when the input voltage has a value of $V_{IN1}$, the peak inductor current may be maintained at a lower level $I_{LPK1}$ (curve 354-1). As the input voltage decreases ($V_{IN3}$), the peak inductor current may be increased $I_{LPK3}$ (curve 354-3). When the peak inductor current value $I_{LPK}$ varies with the regulator input voltage $V_{IN}$, relatively constant amount of charge $Q_1$ (the cross-hatched area) to $Q_3$ (the dotted area) can be maintained between the synchronous rectifier current $I_P(t)$ and the load current $I_O$. Thus, by modulating the peak inductor current value as a function of the regulator input voltage $V_{IN}$, the ripple injection circuit can operate with varying input voltage conditions to generate a current injection signal with a relatively constant magnitude.

Peak Inductor Current Modulation in PFM Boost Regulator

In a boost switching regulator under PFM control, the switching frequency of the boost regulator varies with the load condition. When the output load condition varies over a wide range, the switching frequency may therefore vary over orders of magnitude. In some applications, it is undesirable to allow the switching frequency of the boost regulator to modulate down into the audio range. It may also be desirable to prevent the switching frequency from reaching a high frequency. Accordingly, methods to maintain the switching frequency of a PFM boost regulator above a given value or within a given range are desired.

In embodiments of the present invention, the peak inductor current $I_{LPK}$ of the PFM boost regulator is modulated as a function of the load current $I_O$, the input voltage $V_{IN}$, the output voltage $V_{OUT}$ and a fixed peak current value. In this manner, the switching frequency of the boost regulator can be maintained above a given value or within a given frequency range over a wide range of load conditions as well as a wide range of input voltage variations and output voltage settings.

In one embodiment, the boost regulator modulates the peak inductor current $I_{LPK}$ as a function of the square root of the product of the load current $I_O$ and the difference between the regulated output voltage and the regulator input voltage. That is, $I_{LPK} \propto \sqrt{I_O(V_{OUT}-V_{IN})}$. Furthermore, in some embodiments of the present invention, the boost regulator modulates the peak inductor current $I_{LPK}$ using a function that approximates the square root function. In particular, in one embodiment, the peak inductor current $I_{LPK}$ is modulated as a function of the load current, the input voltage $V_{IN}$ and the output voltage $V_{OUT}$ as follows:

$$I_{LPK} = N \cdot I_O + \left(\frac{V_{OUT} - V_{IN}}{R}\right) + I_{PFIX} \qquad \text{Eq. A}$$

where R and N denote constants, $I_{PFIX}$ denotes a fixed peak current value, $V_{OUT}$ is the output voltage of the boost regulator, and $V_{IN}$ is the input voltage to the boost regulator where $V_{OUT} > V_{IN}$, and $I_O$ is the load current. By modulating the peak inductor current $I_{LPK}$ of the boost regulator as described above, the switching frequency of the boost regulator can be maintained above a given value or within a given range over varying load conditions or varying input-output voltage conditions. More specifically, the fixed peak current value $I_{PFIX}$ is provided to establish a minimum current value for the peak inductor current. In cases where the regulator input voltage and the regulated output voltage are very close in value and the load current is very small, the fixed peak current value $I_{PFIX}$ sets the minimum peak inductor current value for the boost regulator.

Figure 11:
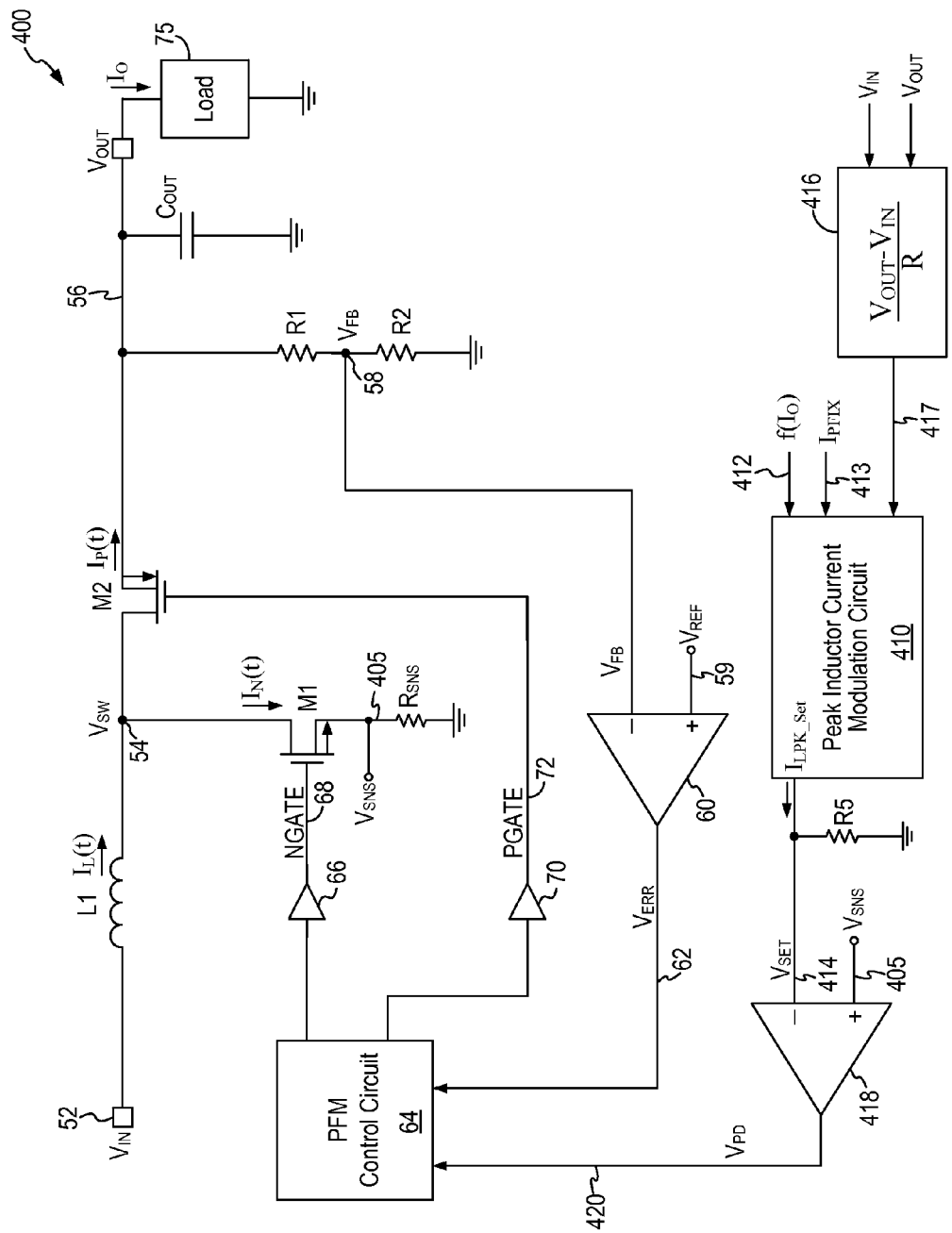
FIG. 11 is a schematic diagram of a boost switching regulator incorporating peak inductor current modulation according to embodiments of the present invention.

FIG. 11 is a schematic diagram of a boost switching regulator incorporating peak inductor current modulation according to embodiments of the present invention. Referring to FIG. 11, a boost switching regulator 400 (or "boost regulator 400") includes a PFM control circuit 64, a main power switch M1, a secondary power switch M2 (the synchronous rectifier), an inductor L1, and an output capacitor $C_{OUT}$. The PFM control circuit 64 generates control signals for driving the main power switch M1 and the synchronous rectifier M2. The boost regulator 400 receives an input voltage $V_{IN}$ on a node 52 and provides an output voltage $V_{OUT}$ having a substantially constant magnitude on an output voltage node 56 for driving a load 75. The output voltage $V_{OUT}$ is fed back to a feedback node 58 of the boost regulator 400 to form a feedback control loop to realize regulation and control of the output voltage $V_{OUT}$.

In boost regulator 400, the output voltage $V_{OUT}$ may be fed back to the feedback node 58 directly or through a resistor divider. In the present embodiment, a resistor divider circuit including resistors R1 and R2 divides down the output voltage $V_{OUT}$ to generate a feedback voltage $V_{FB}$ at the feedback node 58 which is coupled to the PFM feedback control loop.

More specifically, the feedback voltage $V_{FB}$ is coupled to an error comparator 60 to be compared with a reference voltage $V_{REF}$ (node 59) to generate an error signal $V_{ERR}$ (node 62) having logical high and low values indicative of the difference between the feedback voltage $V_{FB}$ and the reference voltage $V_{REF}$. The error signal $V_{ERR}$ is then provided to the PFM control circuit 64 to generate the control signals on nodes 68 and 72 for driving the main power switch M1 and the synchronous rectifier M2, respectively. Gate drivers 66 and 70 may be used to drive the respective control signals onto the respective control terminals of the power switches M1 and M2.

The control signals are operative to turn power switch M1 and M2 on and off alternately so that a switching voltage $V_{SW}$ is generated at the switching node 54. In particular, when the PFM control circuit 64 turns on the main power switch M1 and turns off the synchronous rectifier M2, inductor L1 has the input voltage $V_{IN}$ impressed upon it, and the current through the inductor builds up. When the PFM control circuit 64 turns off the main power switch M1 and turns on the power switch M2, the voltage across the inductor L1 reverses (referred to as "fly back") and inductor L1 transfers energy through the synchronous rectifier M2 to the output capacitor $C_{OUT}$ and the load 75. The output capacitor $C_{OUT}$ filters the ramping inductor current to generate a substantially constant output voltage $V_{OUT}$ at the output node 56. In the present embodiment, the boost regulator 400 implements a PFM control scheme where the frequency for turning on the power switches is varied as a function of load condition. When the load condition is heavy, the power switches are turned on and off more frequently to supply sufficient load current to maintain the output voltage. When the load condition is light and the load current demand is low, the power switches may be turned on and off less frequently to maintain the output voltage.

In the present embodiment, the main power switch M1 is implemented as an NMOS transistor and is driven by a control signal NGATE (node 68). Meanwhile, the synchronous rectifier M2 is implemented as a PMOS transistor and is driven by a control signal PGATE (node 72). The control signals NGATE and PGATE are exclusive of each other so that only one of the main power switch M1 and synchronous rectifier M2 is turned on at a time but both switches can be turned off at the same time. The use of NMOS and PMOS transistors as the main and secondary power switches, respectively, is illustrative only and is not intended to be limiting. The main and secondary power switches can be implemented using NMOS or PMOS transistor devices and the PFM control circuit can be configured to generate control signals having the appropriate signal polarities to drive the power switches.

In embodiments of the present invention, the boost regulator 400 includes a peak inductor current modulation circuit 410 for setting the peak inductor current level as a function of the load current $I_O$, the regulator input voltage $V_{IN}$, the regulated output voltage $V_{OUT}$ and a fixed peak current value $I_{PFIX}$. In particular, as shown by the waveforms in FIG. 3, the peak inductor current level $I_{LPK}$ determines the On-time for the main power switch M1 which in turn determines the switching frequency of the boost regulator. In other words, in the present example, the peak inductor current determines the On-time of the NGATE control signal used to control the main power switch M1. In one embodiment, the peak inductor current modulation circuit 410 sets the peak inductor current level set using Equation A above where the peak inductor current value is set as a function of the load current, the difference between the output voltage and the input voltage and the fixed peak current value.

In the present embodiment, the peak inductor current modulation circuit 410 receives an input signal being a function of the load current $I_O$, $f(I_O)$, on an input terminal 412. In one embodiment, the signal $f(I_O)$ is the average of the synchronous rectifier current $I_P(t)$ over a full cycle or period, that is, $f(I_O)=\text{Avg}(I_P(t))$. Circuit 410 also receives a fixed peak current value $I_{PFIX}$ (node 413) and a signal (node 417) related to the output voltage $V_{OUT}$ and the input voltage $V_{IN}$. As described with reference to Equation A above, the fixed peak current value $I_{PFIX}$ (node 413) is used to establish a minimum value of the peak inductor current $I_{LPK}$ (when the output voltage $V_{OUT}$ may be close to the input voltage $V_{IN}$ and when the load current may be zero or very small. A voltage calculation circuit 416 receives the output voltage $V_{OUT}$ and the input voltage $V_{IN}$ and generates an output signal (node 417) indicative of the difference between the output voltage $V_{OUT}$ and the input voltage $V_{IN}$, scaled by a constant R. The signal $(V_{OUT}-V_{IN})/R$ (node 417) is then provided to the peak inductor current modulation circuit 410. The peak inductor current modulation circuit 410 applies all of the aforementioned values to determine a peak inductor current set value $I_{LPK\_Set}$. In one embodiment, the peak inductor current set value $I_{LPK\_SET}$ is set using Equation A above where the peak inductor current set value $I_{LPK\_Set}$ is set as a function of the load current, the difference between the output voltage and the input voltage and the fixed peak current value.

To control the On-time for the main power switch M1, the inductor current $I_N(t)$ flowing through the main power switch M1 is measured. In the present example, a sense resistor $R_{SNS}$ is coupled to the source terminal of the main power switch M1 to measure the inductor current flowing through the main power switch when the main power switch is turned on. A voltage $V_{SNS}$ (node 405) developed across the sense resistor $R_{SNS}$ is indicative of the instantaneous inductor current $I_N(t)$ flowing through the main power switch.

In the present embodiment, the peak inductor current set value $I_{LPK\_Set}$ generated by the peak inductor current modulation circuit 410 is applied to a resistor R5 to generate a voltage $V_{SET}$ indicative of the current value $I_{LPK\_Set}$. In other embodiments, other methods to convert the peak inductor current set value $I_{LPK\_Set}$ to a voltage value may be used. The voltage $V_{SET}$ is compared with the voltage $V_{SNS}$ (node 405) at a comparator 418. The comparator 418 generates an output signal $V_{PD}$ (node 420) indicative of the instantaneous inductor current $I_N(t)$ reaching the set value for the peak inductor current $I_{LPK\_SET}$. The PFM control circuit 64 generates the control signals NGATE and PGATE based on the signals $V_{PD}$ and $V_{ERR}$ to adjust the duration of the main switch cycle and the secondary switch cycle so that a switching frequency above a given value or a switching frequency within specific limits is maintained over varying load conditions and also over input voltage variations and output voltage settings. In particular, when the signal $V_{PD}$ is asserted to indicate that the instantaneous inductor current $I_N(t)$ has reached the set value for the peak inductor current $I_{LPK\_Set}$, the PFM control circuit 64 terminates the On-time for the main power switch M1 and initiates the On-time for the synchronous rectifier M2.

Figure 12:
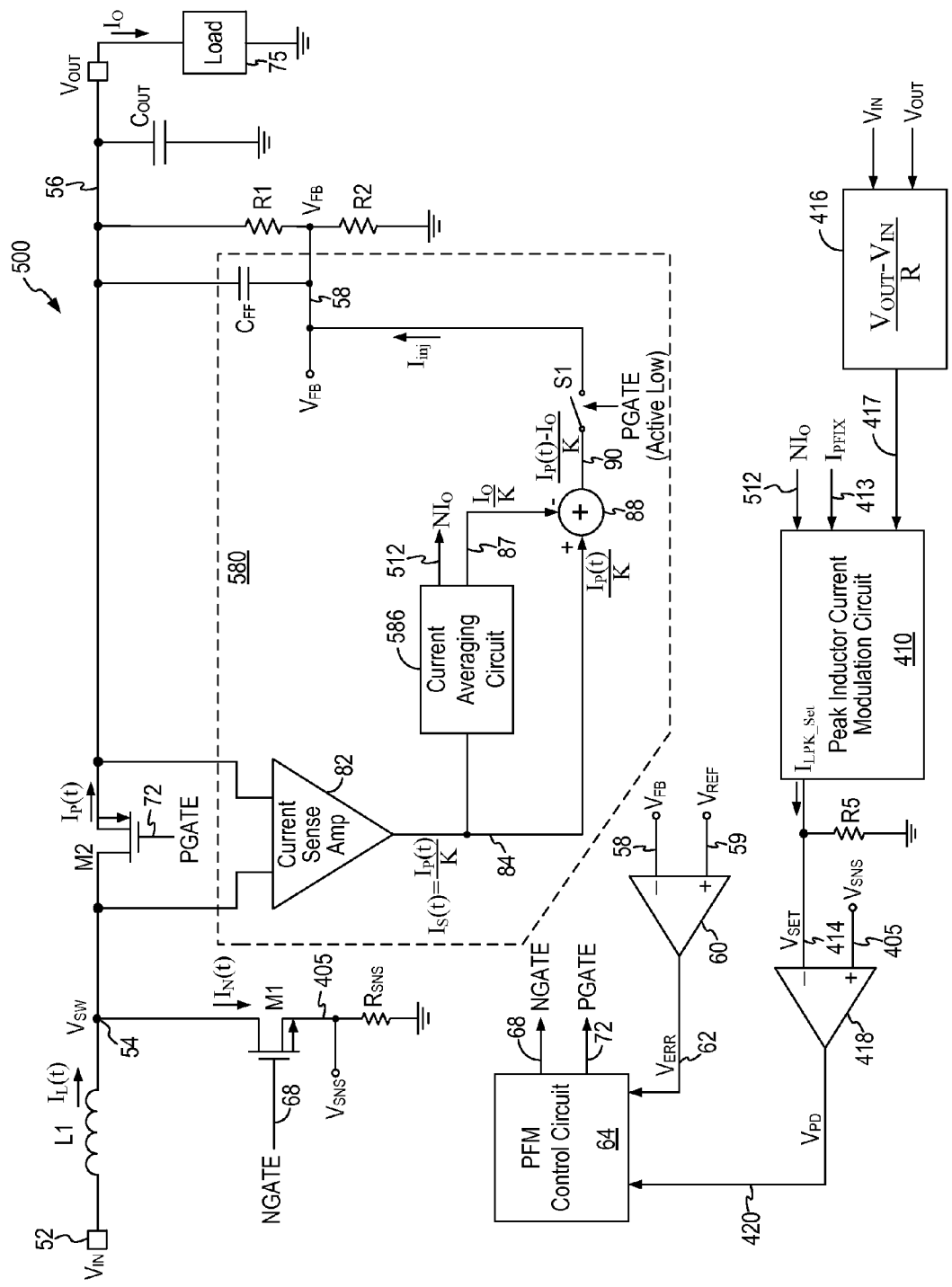
FIG. 12 is a schematic diagram of a boost switching regulator incorporating peak inductor current modulation according to embodiments of the present invention.

FIG. 12 is a schematic diagram of a boost switching regulator incorporating peak inductor current modulation according to embodiments of the present invention. Like elements in FIGS. 11 and 12 are given like reference numerals and will not be further described. FIG. 12 illustrates one embodiment for generating a load current value for use by the peak inductor current modulation circuit 410. In particular, the boost regulator 500 in FIG. 12 incorporates a ripple injection circuit as described above with reference to FIG. 4. The peak inductor current modulation circuit 410 leverages the current average circuit 586 in the ripple injection circuit 580 to obtain a measure of the load current 512 used to modulate the peak inductor current.

Referring to FIG. 12, the ripple injection circuit 580 includes a current sense amplifier 82 coupled across the synchronous rectifier M2 to measure the synchronous rectifier current $I_P(t)$. In the present embodiment, the current sense amplifier 82 also operates to scale down the measured current by a factor of K. Thus, the current sense amplifier 82 generates an output current $I_S(t)$ (node 84) being proportional to the synchronous rectifier current $I_P(t)$, that is, $I_S(t)=I_P(t)/K$. The current $I_S(t)$ represents the synchronous rectifier current flowing through the synchronous rectifier M2. The scaled synchronous rectifier current $I_S(t)$ is averaged to determine the load current being drawn over that time period. In the present embodiment, a current averaging circuit 586 receives the current $I_S(t)$ and generates a scaled load current $I_O/K$ (node 87) being an average of the current $I_S(t)$, that is, $I_O/K=\text{Avg}(I_S(t))=\text{Avg}(I_P(t)/K)$.

The current injection signal $I_{inj}$ is generated by taking the difference between the current $I_S(t)$ (or $I_P(t)/K$), representing the scaled synchronous rectifier current at synchronous rectifier M2, and current $I_O/K$, representing the scaled load current being drawn. In the present embodiment, a current subtractor 88 is used to subtract current $I_O/K$ from current $I_P(t)/K$ to generate the current injection signal $I_{inj}=(I_P(t)-I_O)/K$ (node 90). In one embodiment, the current subtractor 88 is a one-quadrant subtractor and only generates positive current difference values.

In the present embodiment, the current injection signal $I_{inj}$ thus generated is injected to the feedback node 58 through a switch S1. Switch S1 is gated by the control signal PGATE for controlling the synchronous rectifier M2. Switch S1 closes when the control signal PGATE is asserted (logical low) to allow the current injection signal $I_{inj}$ to be injected. Switch S1 is open when the control signal PGATE is deasserted (logical high) to terminate the injection of the current injection signal.

Meanwhile, the current averaging circuit 586 also generates a scaled load current $NI_O$ on an output node 512, N being a constant. The scaled load current $NI_O$ is coupled as an input signal to the peak inductor current modulation circuit 410. The peak inductor current modulation circuit 410 determines the set value for the peak inductor current $I_{LPK\_Set}$ based on the scaled load current $NI_O$, the $(V_{OUT}-V_{IN})/R$ value (node 417) and the fixed peak current value $I_{PFIX}$ (node 413). In this manner, the peak inductor current $I_{LPK}$ of the boost regulator 500 is modulated as a function of the load current $I_O$, the regulated output voltage $V_{OUT}$ and the regulator input voltage $V_{IN}$ so that a switching frequency above a given value or within specified limits is maintained over varying load conditions as well as varying input voltage conditions and output voltage settings. In some embodiments, the peak inductor current modulation circuit 410 applies Equation A above to set the peak inductor current set value $I_{LPK\_Set}$.

The boost switching regulators in the above-described embodiments can be constructed using integrated circuits and discrete components at various levels of integration In some embodiments, the boost switching regulator is formed using an integrated circuit incorporating the control circuitry and the power switches and using discrete components for the inductor, the output capacitor and the resistor divider. In other embodiments, the power switches may be formed using discrete transistors outside of the control circuitry integrated circuit. The exact level of integration of the boost regulator is not critical to the practice of the present invention.

In the above described embodiments, the boost switching regulator is implemented using a PFM feedback control scheme. In other embodiments, the ripple injection circuit described above can be incorporated into a boost regulator using a Pulse-Width Modulation (PWM) feedback control scheme which is comparator based and relies on voltage ripple on the feedback node for loop stability. For example, hysteretic regulators or constant on-time (COT) regulators can use the ripple injection circuit described herein during PWM mode of operation. The ripple injection circuit and method described above has applications in comparator based feedback control architectures, whether in PFM or PWM mode.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A control circuit in a boost switching regulator, the boost switching regulator being configured to receive an input voltage on a first terminal of an inductor and to generate a regulated output voltage on an output terminal for driving a load, the boost switching regulator comprising a main power switch coupled between a second terminal of the inductor and ground, a synchronous rectifier coupled between the second terminal of the inductor and the output terminal, and an output capacitor coupled to the output terminal and ground, the control circuit being configured to control the main power switch and the synchronous rectifier using a Pulse Frequency Modulation (PFM) feedback control loop, the regulated output voltage being fed back to the boost switching regulator as a feedback voltage on a feedback node of the feedback control loop, the control circuit comprising:

a ripple injection circuit comprising a current injection signal generation circuit configured to generate a current injection signal and a feedforward capacitor coupled between the output terminal and the feedback node of the feedback control loop, the feedforward capacitor integrating a current associated with the current injection signal to generate a voltage ripple signal at the feedback node for use by the PFM feedback control loop, wherein the current injection signal is the difference between a first current indicative of a synchronous rectifier current flowing in the synchronous rectifier when the synchronous rectifier is turned on and a second current indicative of a load current flowing to the load.

2. The control circuit of claim 1, wherein the first current comprises the synchronous rectifier current flowing in the synchronous rectifier when the synchronous rectifier is turned on scaled by a first scaling factor, and the second current comprises the load current scaled by the first scaling factor.

3. The control circuit of claim 2, wherein the first scaling factor comprises a scaling factor of 1/K where K is 1 or more.

4. The control circuit of claim 1, wherein the current injection signal comprises positive current values only, the current injection signal having a zero current value when the second current is greater than the first current.

5. The control circuit of claim 1, wherein the current injection signal is indicative of the charge being placed on the output capacitor from the inductor current flowing through the synchronous rectifier when the synchronous rectifier is turned on.

6. The control circuit of claim 1, wherein the load current comprises an average of the synchronous rectifier current.

7. The control circuit of claim 1, wherein the current injection signal generation circuit comprises:
   a current sense amplifier coupled to sense a current flowing across the synchronous rectifier and to scale the sensed current by a first scaling factor, the current sense amplifier generating an output current being the first current;
   a current average circuit configured to receive the first current and to generate an output current being an average of the first current, the output current being the second current; and
   a current subtractor configured to subtract the second current from the first current to generate the current injection signal at an output terminal.

8. The control circuit of claim 7, wherein the current injection signal generation circuit further comprises a switch coupled between the output terminal of the current subtractor and the feedback node, the switch being controlled by a first control signal, wherein the switch is closed to pass the current injection signal to the feedback node when the first control signal has a state indicative of the synchronous rectifier being turned on.

9. The control circuit of claim 3, wherein the first scaling factor comprises the scaling factor of 1/K where K is selected to generate a sufficient current injection signal for the feedback control loop under a worst case load current condition.

10. The control circuit of claim 3, wherein the first scaling factor comprises the scaling factor of 1/K where K is varied as a function of the load current, the value of K decreasing when the load current is increasing.

11. The control circuit of claim 1, wherein a capacitance of the feedforward capacitor is varied as a function of the load current, the capacitance value increasing when the load current is decreasing.

12. The control circuit of claim 1, wherein the boost switching regulator modulates a peak inductor current as a function of the load current, the peak inductor current increasing when the load current is increasing, wherein the current injection signal is maintained at a relatively constant value over varying load current conditions.

13. The control circuit of claim 1, wherein the boost switching regulator modulates a peak inductor current as a function of the input voltage, the peak inductor current increasing when the input voltage is decreasing, wherein the current injection signal is maintained at a relatively constant value over varying input voltage conditions.

14. The control circuit of claim 13, wherein the boost switching regulator modulates the peak inductor current as a function of the difference between the regulated output voltage and the input voltage.

15. The control circuit of claim 14, wherein the boost switching regulator modulates the peak inductor current as a function of the difference between the regulated output voltage and the input voltage scaled by a constant.

16. The control circuit of claim 1, wherein the synchronous rectifier comprises a PMOS transistor.

17. A method for controlling a boost switching regulator, the boost switching regulator being configured to receive an input voltage on a first terminal of an inductor and to generate a regulated output voltage on an output terminal for driving a load, the boost switching regulator comprising a main power switch coupled between a second terminal of the inductor and ground, a synchronous rectifier coupled between the second terminal of the inductor and the output terminal, and an output capacitor coupled to the output terminal and ground, the method being configured to control the main power switch and the synchronous rectifier using a Pulse Frequency Modulation (PFM) feedback control loop, the regulated output voltage being fed back to the boost switching regulator as a feedback voltage on a feedback node of the feedback control loop, the method comprising:
   measuring a synchronous rectifier current flowing in the synchronous rectifier when the synchronous rectifier is turned on;
   generating a first current indicative of the synchronous rectifier current flowing in the synchronous rectifier;
   generating a second current indicative of a load current flowing to the load;
   subtracting the second current from the first current to generate a current injection signal;
   injecting the current injection signal to the feedback node;
   coupling a feedforward capacitor between the output terminal and the feedback node of the feedback control loop; and
   integrating at the feedforward capacitor a current associated with the current injection signal to generate a voltage ripple signal at the feedback node for use by the PFM feedback control loop.

18. The method of claim 17, wherein generating the first current indicative of the synchronous rectifier current flowing in the synchronous rectifier comprises:
   scaling the measured synchronous rectifier current flowing in the synchronous rectifier by a first scaling factor; and
   providing the scaled synchronous rectifier current as the first current.

19. The method of claim 18, wherein generating the second current indicative of the load current flowing to the load comprises:
   scaling the load current by the first scaling factor; and
   providing the scaled load current as the second current.

20. The method of claim 18, wherein generating the second current indicative of the load current flowing to the load comprises:
   generating an average of the first current as the second current.

21. The method of claim 18, wherein the first scaling factor comprises a scaling factor of 1/K where K is 1 or more.

22. The method of claim 17, wherein subtracting the second current from the first current to generate the current injection signal comprises:
   generating the current injection signal having positive current values only; and
   generating the current injection signal having a zero current value when the second current is greater than the first current.

23. The method of claim 17, wherein injecting the current injection signal to the feedback node comprises:
   providing the current injection signal to the feedback node during a time period when the synchronous rectifier is turned on.

24. The method of claim 18, wherein the first scaling factor comprises a scaling factor of 1/K where K is selected to generate a sufficient current injection signal for the feedback control loop under a worst case load current condition.

25. The method of claim 18, wherein the first scaling factor comprises a scaling factor of 1/K where K is varied as a function of the load current, the value of K decreasing when the load current is increasing.

26. The method of claim 18, wherein the capacitance of the feedforward capacitor is varied as a function of the load current, the capacitance value increasing when the load current is decreasing.

27. The method of claim 17, further comprising:
modulating a peak inductor current value of the boost switching regulator as a function of the load current, the peak inductor current increasing when the load current is increasing, wherein the current injection signal is maintained at a relatively constant value over varying load current conditions.

28. The method of claim 17, further comprising:
modulating a peak inductor current value of the boost switching regulator as a function of the input voltage, the peak inductor current increasing when the input voltage is decreasing, wherein the current injection signal is maintained at a relatively constant value over varying input voltage conditions.

29. The method of claim 28, wherein modulating a peak inductor current value of the boost switching regulator as a function of the input voltage comprises modulating a peak inductor current value of the boost switching regulator as a function of the difference between the regulated output voltage and the input voltage.

* * * * *